(12) United States Patent
Kim et al.

(10) Patent No.: US 10,330,850 B2
(45) Date of Patent: Jun. 25, 2019

(54) DISPLAY APPARATUS

(71) Applicant: Samsung Display Co., Ltd., Yongin-Si, Gyeonggi-Do (KR)

(72) Inventors: Youngchun Kim, Hwaseong-si (KR); Kyung-min Kim, Hwaseong-si (KR); Hyuk-hwan Kim, Hwaseong-si (KR); Hee-kwang Song, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 86 days.

(21) Appl. No.: 15/498,677

(22) Filed: Apr. 27, 2017

(65) Prior Publication Data
US 2018/0088266 A1   Mar. 29, 2018

(30) Foreign Application Priority Data
Sep. 26, 2016   (KR) ......................... 10-2016-0123299

(51) Int. Cl.
| | | |
|---|---|---|
| *G02F 1/13357* | (2006.01) | |
| *G02F 1/1335* | (2006.01) | |
| *G02F 1/1333* | (2006.01) | |
| *G02F 1/13* | (2006.01) | |
| *F21V 8/00* | (2006.01) | |

(52) U.S. Cl.
CPC .......... *G02B 6/005* (2013.01); *G02B 6/0053* (2013.01); *G02F 1/1323* (2013.01); *G02F 1/1336* (2013.01); *G02F 1/133345* (2013.01); *G02F 1/133377* (2013.01); *G02F 1/133509* (2013.01); *G02F 1/133528* (2013.01); *G02F 1/133615* (2013.01); *G02F 1/133617* (2013.01); *G02F 2001/133521* (2013.01); *G02F 2001/133614* (2013.01); *G02F 2202/28* (2013.01); *G02F 2202/36* (2013.01)

(58) Field of Classification Search
CPC ........ G02F 2001/133614; G02F 2001/133521; G02B 6/0051
See application file for complete search history.

(56) References Cited

U.S. PATENT DOCUMENTS

| | | | | |
|---|---|---|---|---|
| 2002/0109809 A1* | 8/2002 | Utsumi | ............. | G02F 1/133509 349/105 |
| 2005/0142379 A1* | 6/2005 | Juni | ..................... | G02B 5/0242 428/690 |

(Continued)

FOREIGN PATENT DOCUMENTS

KR   1020160061140 A   5/2016

*Primary Examiner* — Alexander P Gross
(74) *Attorney, Agent, or Firm* — Cantor Colburn LLP

(57) ABSTRACT

A display apparatus includes a display module including a light conversion member including a plurality of quantum dots, a backlight unit providing a first light to the display module, and an optical filter disposed between the display module and the backlight unit. The optical filter includes a transmission filter layer transmitting a light in the first wavelength range and a second wavelength range, reflecting a light in a third wavelength range, and having a first effective refractive index and a viewing angle control layer disposed between the transmission filter layer and the display module to couple the transmission filter layer and the display module and having a second effective refractive index equal to or smaller than the first effective refractive index.

22 Claims, 13 Drawing Sheets

(56) References Cited

U.S. PATENT DOCUMENTS

| | | | |
|---|---|---|---|
| 2009/0147497 A1* | 6/2009 | Nada | G02B 6/0023 362/84 |
| 2013/0242228 A1* | 9/2013 | Park | G02F 1/133617 349/61 |
| 2015/0055058 A1 | 2/2015 | Jang et al. | |
| 2016/0146989 A1 | 5/2016 | Sakat et al. | |
| 2016/0148963 A1 | 5/2016 | Creazzo et al. | |
| 2016/0154275 A1 | 6/2016 | Saneto et al. | |
| 2016/0223870 A1 | 8/2016 | Miki et al. | |
| 2016/0298828 A1* | 10/2016 | Chang | G02F 1/1336 |
| 2017/0315402 A1* | 11/2017 | Kashiwagi | G02F 1/133606 |

* cited by examiner

DISPLAY APPARATUS

This application claims priority to Korean Patent Application No. 10-2016-0123299, filed on Sep. 26, 2016, and all the benefits accruing therefrom under 35 U.S.C. § 119, the content of which in its entirety is herein incorporated by reference.

BACKGROUND

1. Field

Exemplary embodiments of the invention relate to a display apparatus. More particularly, exemplary embodiments of the invention relate to a display apparatus having improved contrast ratio.

2. Description of the Related Art

Electronic devices, such as a mobile communication terminal, a digital camera, a notebook, a monitor, a television set, etc., include a display apparatus to display an image.

In general, the display apparatus includes a display panel displaying the image and a backlight unit providing the display panel with a light. The display panel controls a transmittance of the light provided from the backlight unit while the light travels through the display panel, and thus a desired image is displayed.

The backlight unit is classified into an edge-illumination type backlight unit adjacent to a side surface of the display panel to provide the light to the display panel through the side surface and a direct-illumination type backlight unit disposed under the display panel to provide the light to a lower surface of the display panel. The edge-illumination type backlight unit includes a light source generating the light and a light guide plate guiding the light. In the edge-illumination type backlight unit, the light source is disposed at one side portion of the light guide plate, and the light guide plate guides the light generated by the light source to the display panel.

SUMMARY

Exemplary embodiments of the invention provide a display apparatus having improved contrast ratio.

Exemplary embodiments of the invention provide a display apparatus including a display module including a light conversion member including a plurality of quantum dots, a backlight unit providing a first light to the display module, and an optical filter disposed between the display module and the backlight unit. The optical filter includes a transmission filter layer transmitting a light in a first wavelength range, reflecting a light in a second wavelength range, and having a first effective refractive index and a viewing angle control layer disposed between the transmission filter layer and the display module to couple the transmission filter layer and the display module and having a second effective refractive index equal to or smaller than the first effective refractive index. The light conversion member converts a portion of the first light provided from the optical filter to a second light having a peak wavelength in the second wavelength range and a third light having a peak wavelength in a third wavelength range, and the second wavelength range has a range value between the first wavelength range and the third wavelength range.

In an exemplary embodiment, the first effective refractive index may be equal to or greater than about 1.7 and equal to or smaller than about 2.2, and the second effective refractive index is greater than about 1.0.

In an exemplary embodiment, the second effective refractive index may be equal to or greater than about 1.5.

In an exemplary embodiment, the display module may include a first substrate including a pixel area disposed thereon, a second substrate disposed above the first substrate and including the light conversion member disposed thereon, and a liquid crystal layer disposed between the first substrate and the second substrate.

In an exemplary embodiment, the display apparatus may further include a first polarizing layer disposed between the first substrate and the viewing angle control layer and a second polarizing layer disposed between the second substrate and the light conversion member, and the viewing angle control layer couples the transmission filter layer with the first polarizing layer.

In an exemplary embodiment, the display apparatus may further include a first polarizing layer disposed between the transmission filter layer and the backlight unit and a second polarizing layer disposed between the second substrate and the light conversion member.

In an exemplary embodiment, the light conversion member may include a first conversion filter including a plurality of first particles absorbing the first light and converting the first light to the second light and a second conversion filter including a plurality of second particles absorbing the first light and converting the first light to a third light, and a particle size of each of the plurality of first particles is different from a particle size of each of the plurality of second particles.

In an exemplary embodiment, the transmission filter layer may include a plurality of first insulating layers each having a first refractive index and a plurality of second insulating layers each having a second refractive index different from the first refractive index, and the plurality of first insulating layers may be alternately stacked with the plurality of second insulating layers.

In an exemplary embodiment, a difference between the first refractive index and the second refractive index may be greater than about zero (0) and equal to or smaller than about 0.5.

In an exemplary embodiment, the display module may further include a roof layer partially spaced apart from the first substrate to define a plurality of cavities, and the liquid crystal layer is disposed in each of the plurality of cavities.

In an exemplary embodiment, the display apparatus may further include an adhesive member disposed under the transmission filter layer to couple the backlight unit with the transmission filter layer.

In an exemplary embodiment, the backlight unit may include a light source generating the first light, a light guide plate guiding the first light provided from the light source to an upper direction, and a light condensing member disposed above the light guide plate to condense the first light and including a plurality of inverse prisms.

In an exemplary embodiment, the viewing angle control layer may include an adhesive material.

In an exemplary embodiment, the viewing angle control layer may include a plurality of beads.

Exemplary embodiments of the invention provide a display apparatus including a backlight unit providing a first light having a peak wavelength in a first wavelength range, a light conversion member converting the first light to a second light or a third light, a transmission filter layer disposed between the backlight unit and the light conversion member, receiving the first light from the backlight unit, and having a first effective refractive index, and a viewing angle control layer which is disposed between the transmission filter layer and the light conversion member, directly contacts the transmission filter layer and has a second effective refractive index equal to or smaller than the first effective refractive index. The transmission filter layer selectively transmits and reflects the first light provided from the backlight unit, a transmission wavelength range of the transmission filter layer is overlapped with a wavelength range of the first light and a wavelength range of the third light, a reflection wavelength range of the transmission filter layer is overlapped with a wavelength range of the second light, and a center wavelength of the second light is greater than a center wavelength of the first light and smaller than a center wavelength of the third light.

In an exemplary embodiment, the viewing angle control layer may include a liquid crystal layer.

Exemplary embodiments of the invention provide a display apparatus including a display member including a light conversion member including a quantum dot, a light source disposed under the display member to generate a light, a light condensing member condensing the light provided from the light source in an upper direction, a transmission filter layer disposed between the light condensing member and the display member, transmitting a light in a first wavelength range and a second wavelength range among the light condensed by the light condensing member, and reflecting a light in a third wavelength range between the first wavelength range and the second wavelength range, and a viewing angle control layer disposed on the transmission filter layer to couple the display member with the transmission filter layer. The light conversion member converts a first light having a peak wavelength in the first wavelength range to a second light having a peak wavelength in the third wavelength range and a third light having a peak wavelength in the second wavelength range, the transmission filter layer has a first effective refractive index, the viewing angle control layer has a second effective refractive index equal to or smaller than the first effective refractive index, and a difference between the first effective refractive index and the second effective refractive index is equal to or greater than about zero (0) and equal to or smaller than about 0.7.

In an exemplary embodiment, the light generated by the light source may be the first light.

In an exemplary embodiment, the light condensing member may include a plurality of inverse prisms.

In an exemplary embodiment, the display apparatus may further include a first polarizing layer disposed between the display member and the light condensing member and a second polarizing layer disposed between the display member and the light conversion member.

Exemplary embodiments of the invention provide a display apparatus including a backlight unit generating a first light, a light conversion member receiving a first light and converting the first light to a second light or a third light, which is different from the first light, and an optical filter disposed between the backlight unit and the light conversion member, transmitting a light having a first wavelength range overlapped with a wavelength range of the first light and a light having a second wavelength range overlapped with a wavelength range of the third light, and reflecting a light having a third wavelength range having a range value between the first wavelength range and the second wavelength range. When an emission angle of the first light traveling to the optical filter from the backlight unit is zero (0), a cut-off amount defined by an amount in which the reflection wavelength range of the optical filter is overlapped with the wavelength range of the first light has a minimum value, and the cut-off amount increases when an increase of the emission angle.

In an exemplary embodiment, the minimum value of the cut-off amount may be zero (0).

In an exemplary embodiment, the optical filter may include a transmission filter layer transmitting the light in the first wavelength range and the light having the second wavelength range, reflecting the light in the third wavelength range, and having a first effective refractive index and a viewing angle control layer disposed between the transmission filter layer and the light conversion member and having a second effective refractive index equal to or smaller than the first effective refractive index.

According to the above, the contrast ratio of the display apparatus may be improved.

BRIEF DESCRIPTION OF THE DRAWINGS

The above and other advantages of the invention will become readily apparent by reference to the following detailed description when considered in conjunction with the accompanying drawings, in which.

DETAILED DESCRIPTION

Figure 1:
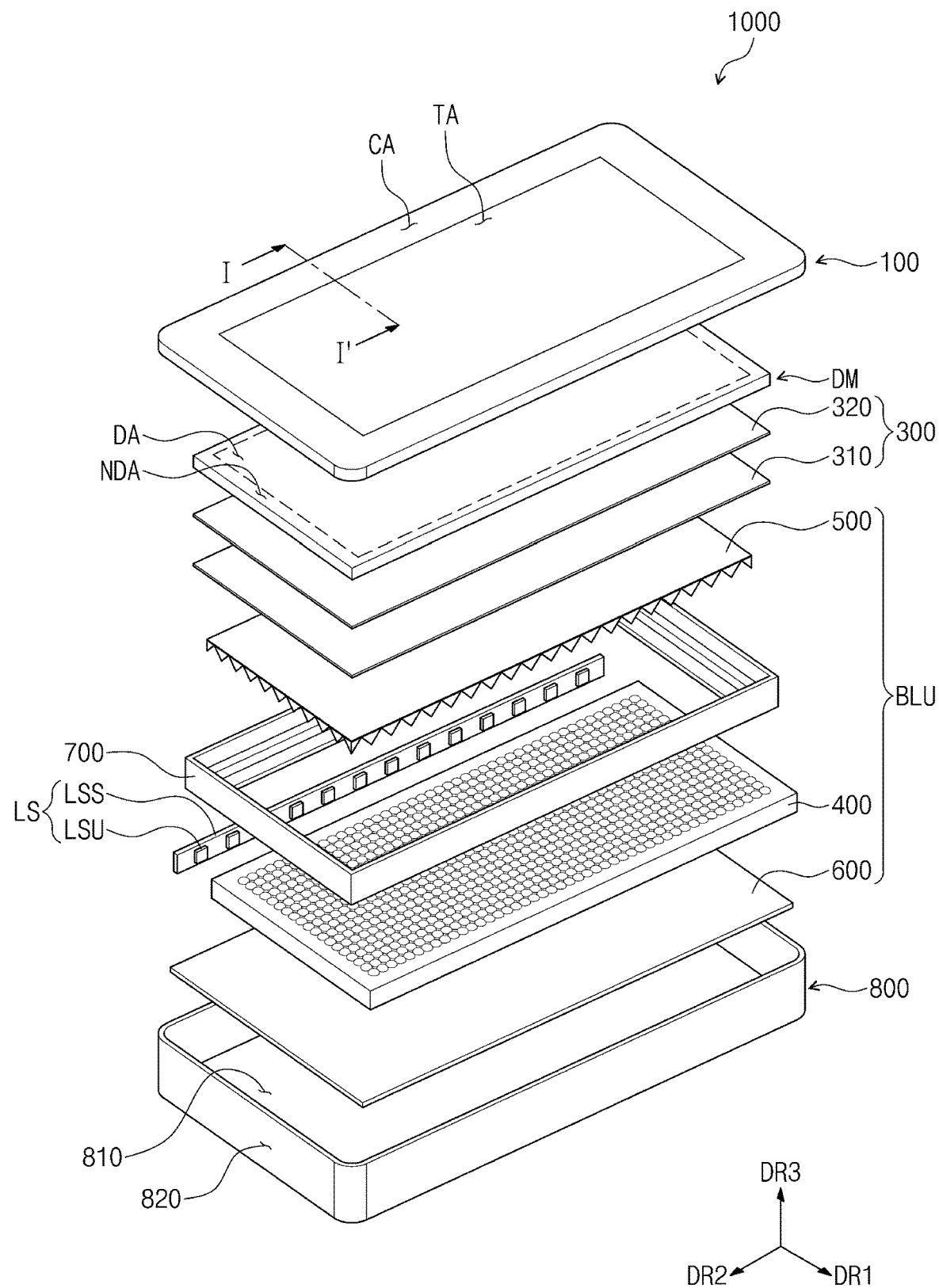
FIG. 1 is an exploded perspective view showing an exemplary embodiment of a display apparatus according to the invention.

Hereinafter, exemplary embodiments of the invention will be explained in detail with reference to the accompanying drawings. The disclosure and methods of accomplishing the same may be understood more readily by reference to the following detailed description of exemplary embodiments and the accompanying drawings. However, the disclosure may be embodied in many different forms, and should not be construed as being limited to the exemplary embodiments set forth herein. Rather, these embodiments are provided so that this invention will be thorough and complete and will fully convey the concept of the invention to those skilled in the art, and the disclosure will only be defined by the appended claims. Like numbers refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

It will be understood that, although the terms, e.g., first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Embodiments described in the disclosure are described with reference to plan views and cross-sectional views that are ideal schematic diagrams. Accordingly, shapes of the exemplary views may vary depending on manufacturing technologies and/or tolerances. Thus, embodiments are not limited to shown specific forms and also include variations in form produced according to manufacturing processes. Therefore, regions illustrated in the drawings are exemplary, and the shapes of the regions illustrated in the drawings are intended to illustrate the specific shapes of the regions of elements and not to limit the scope of the disclosure.

Hereinafter, the invention will be explained in detail with reference to the accompanying drawings.

Figure 2:
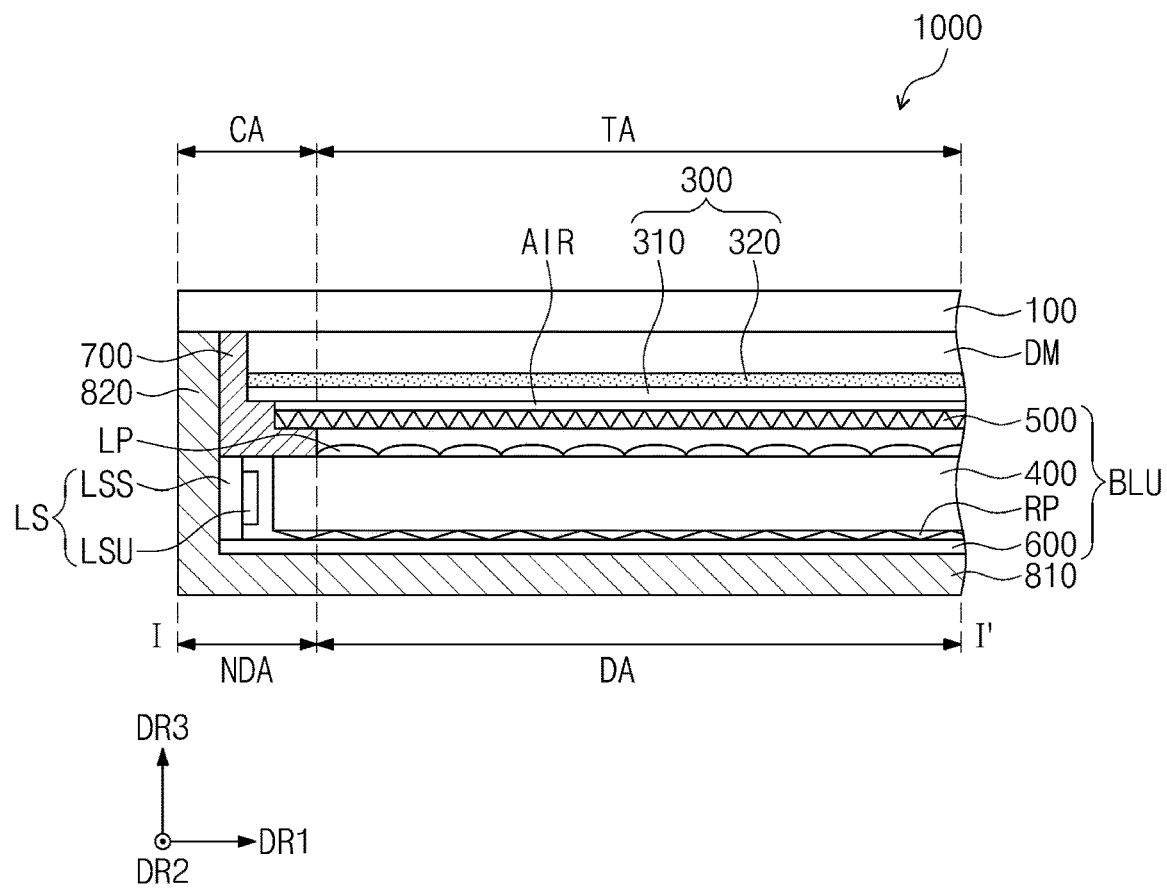
FIG. 2 is a cross-sectional view taken along line I-I' shown in FIG. 1.

FIG. 1 is an exploded perspective view showing a display apparatus 1000 according to an exemplary embodiment of the invention, and FIG. 2 is a cross-sectional view taken along line I-I' shown in FIG. 1.

Referring to FIGS. 1 and 2, the display apparatus 1000 has a rectangular shape with short sides in a first direction DR1 and long sides in a second direction DR2, for example, but the shape of the display apparatus 1000 should not be limited to the rectangular shape.

The display apparatus 1000 includes a window member 100, a display module DM, an optical filter 300, a backlight unit BLU, a mold frame 700, and an accommodating member 800.

For the convenience of explanation, a direction in which an image is displayed in the display apparatus 1000 is referred to as an upper direction and a direction opposite to the upper direction is referred to as a lower direction, but they should not be limited thereto or thereby. In the illustrated exemplary embodiment, the upper and lower directions are substantially parallel to a third direction DR3 perpendicular to a first direction DR1 and a second direction DR2. The third direction DR3 may be a reference direction to distinguish a front surface from a rear surface of the following components of the display apparatus 1000. However, the upper direction and the lower direction are relative to each other, and thus the upper direction and the lower direction may be changed to other directions.

The window member 100 includes a light transmission area TA transmitting an image provided from the display module DM and a light block area CA adjacent to the light transmission area TA and not transmitting the image. The light transmission area TA is disposed at a center of the display apparatus 1000 in a plane surface defined by the first direction DR1 and the second direction DR2. The light block area CA is disposed in the vicinity of the light transmission area TA and has a frame shape surrounding the light transmission area TA.

According to another exemplary embodiment of the invention, the window member 100 may include only the light transmission area TA. That is, in another exemplary embodiment, the light block area CA may be omitted. In this case, the image may be displayed through the entire area of an upper surface of the window member 100.

In an exemplary embodiment, the window member 100 may include a glass, sapphire, or plastic material, for example.

The display module DM is disposed under the window member 100.

In the plane surface, a display area DA through which the image is displayed and a non-display area NDA through which the image is not displayed are defined in the display module DM. The display area DA is defined at a center of the display module DM and overlapped with the light transmission area TA of the window member 100 when viewed in a plan view. The non-display area NDA is defined to surround the display area DA and overlapped with the light block area CA of the window member 100. The display module DM will be described in detail with reference to FIG. 4 later.

The optical filter 300 is disposed under the display module DM. The optical filter 300 selectively transmits or absorbs the light provided from the backlight unit BLU and controls a wavelength range of the light transmitting therethrough. The optical filter 300 includes a transmission filter layer 310 and a viewing angle control layer 320 disposed on the transmission filter layer 310. The optical filter 300 will be described in detail with reference to FIGS. 3 to 12D later.

The backlight unit BLU is disposed under the optical filter 300 to provide the light to the display module DM. In the illustrated exemplary embodiment, the backlight unit BLU may be, but not limited to, an edge-illumination type backlight unit, for example.

The backlight unit BLU includes a light source LS, a light guide plate 400, a light condensing member 500, and a reflective sheet 600.

In the illustrated exemplary embodiment, the light source LS is adjacent to one side portion of the light guide plate 400 in the first direction DR1, but it should not be limited thereto or thereby. That is, the light source LS may be adjacent to at least one side surface of side surfaces of the light guide plate 400.

The light source LS includes a plurality of light source units LSU and a light source substrate LSS. The light source units LSU generate the light, which is to be provided to the display module DM, and provide the light to the light guide plate 400. According to the illustrated exemplary embodiment, the light source units LSU may include a light emitting diode ("LED") as a point light source, for example, but they should not be limited thereto or thereby. That is, according to another exemplary embodiment, the light source units LSU may include an ultraviolet lamp or a laser diode, for example. In addition, according to another exemplary embodiment, one LED or a plurality of LED groups may be employed as the light source units LSU. Further, according to another exemplary embodiment, the light source units LSU may be a linear light source, for example.

The light source units LSU may be disposed (e.g., mounted) on the light source substrate LSS. The light source substrate LSS faces the one side portion of the light guide plate 400 in the first direction DR1 and extends in the second direction DR2. A wiring line may be printed on the light source substrate LSS to provide and control a power to the light source units LSU. The light source substrate LSS may include a light source controller (not shown) connected to the light source units LSU. The light source controller (not shown) analyzes the image displayed through the display module DM to output a local dimming signal and controls a brightness of the light generated by the light source units LSU in response to the local dimming signal. According to another exemplary embodiment of the invention, the light source controller (not shown) may be disposed (e.g., mounted) on a separate circuit board, and a position of the light source controller should not be limited to a specific position.

The light guide plate 400 is disposed under the display module DM. In an exemplary embodiment, the light guide plate 400 may have a plate-like shape, for example. The light guide plate 400 changes a path, in which the light provided from the light source LS travels, to the upper direction in which the display module DM is disposed.

The light guide plate 400 may include a plurality of reflective patterns RP disposed on a lower surface of the light guide plate 400. The reflective patterns RP may have a shape protruded downward from the lower surface of the light guide plate 400. The reflective patterns RP scatter or reflect the light incident to the light guide plate 400. The light provided to the light guide plate 400 from the light source LS is scattered or reflected by the reflective patterns RP, and then travels to the upper direction of the light guide plate 400 after exiting from the light guide plate 400. In FIG. 2, each reflective pattern RP has a triangular shape, for example, but the shape of the reflective patterns RP should not be limited to the triangular shape. That is, in another exemplary embodiment, each reflective pattern RP may have a semi-circular shape or a convex lens shape, for example.

In addition, the light guide plate 400 may further include a convex pattern LP disposed on an upper surface of the light guide plate 400. The convex pattern LP has a shape protruded upward from the upper surface of the light guide plate 400. The convex pattern LP condenses the light exiting from the light guide plate 400.

The light guide plate 400 includes a material having high light transmittance in a visible light area. In an exemplary embodiment, the light guide plate 400 may include a transparent polymer resin, e.g., polycarbonate ("PC"), polymethylmethacrylate ("PMMA"), etc.

The light condensing member 500 is disposed between the light guide plate 400 and the optical filter 300. The light provided to the light condensing member 500 from the light guide plate 400 is condensed by the light condensing member 500 and provided to the display module DM. In the illustrated exemplary embodiment, the light condensing member 500 may be, but not limited to, an inverse prism sheet including a plurality of inverse prisms.

Although not shown in drawings, the backlight unit BLU may further include at least one optical sheet (not shown). The optical sheet (not shown) is disposed on or under the light condensing member 500. In an exemplary embodiment, the optical sheet (not shown) may be a diffusion sheet or a protective sheet.

The reflective sheet 600 is disposed under the light guide plate 400. The reflective sheet 600 reflects the light leaking downward from the light guide plate 400 to the upper direction. The reflective sheet 600 includes a material reflecting the light. In an exemplary embodiment, the reflective sheet 600 may include aluminum, for example.

The mold frame 700 is disposed above the light guide plate 400. In the illustrated exemplary embodiment, the mold frame 700 has a frame shape. In detail, the mold frame 700 is disposed to correspond to an edge area of the upper surface of the light guide plate 400. The mold frame 700 holds the display module DM, the optical filter 300, and the backlight unit BLU.

The mold frame 700 has a step shape in cross-section. In detail, the mold frame 700 includes a plurality of flat portions disposed inside the frame shape of the mold frame 700. Each of the flat portions may extend parallel to a plane surface defined by the first direction DR1 and the second direction DR2, and each of the flat portions may define a step difference with an adjacent flat portion thereto.

The display module DM, the optical filter 300, and the light condensing member 500 may be placed on the flat portions disposed inside the mold frame 700. Accordingly, the placed members may be held by the step differences of the mold frame 700, and the light condensing member 500 and the optical filter 300 may be spaced apart from each other.

The accommodating member 800 is disposed at a lowermost position of the display apparatus 1000 to accommodate the backlight unit BLU. The accommodating member 800 includes a bottom portion 810 and a plurality of sidewalls 820 connected to the bottom portion 810. In the illustrated exemplary embodiment, the light source LS may be disposed on an inner side surface of one sidewall of the sidewalls 820 of the accommodating member 800. The accommodating member 800 may include a metal material having rigidity.

An air layer AIR may further be provided between the transmission filter layer 310 and the light condensing member 500.

Figure 3:
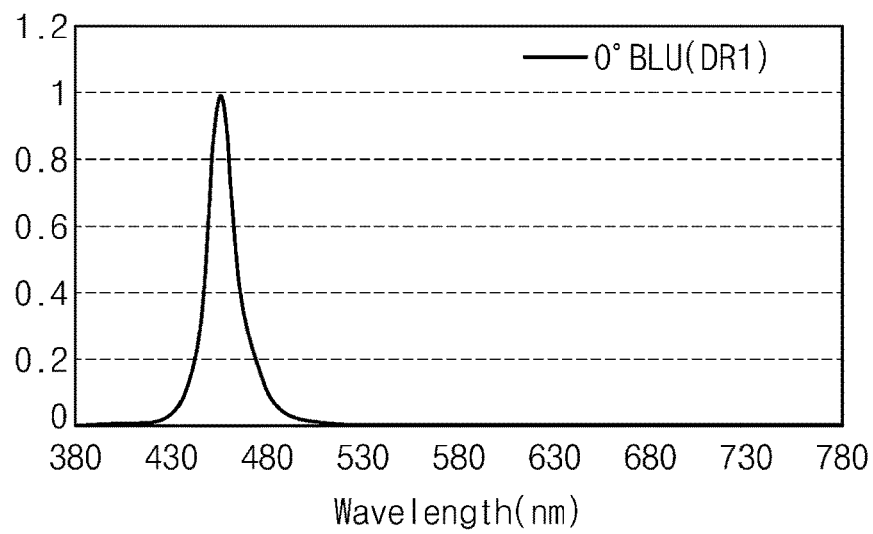
FIG. 3 is a graph showing a wavelength range of a light provided from a backlight unit.

FIG. 3 is a graph showing a wavelength range of a light provided from a backlight unit.

Referring to FIGS. 2 and 3, the light source LS of the backlight unit BLU may generate a first light having a peak wavelength in a first wavelength range. In the exemplary embodiment, the first wavelength range may be in a range equal to or greater than about 400 nanometers (nm) and equal to or smaller than about 500 nm, for example. That is, the light source units LSU may generate a blue light.

Figure 4:
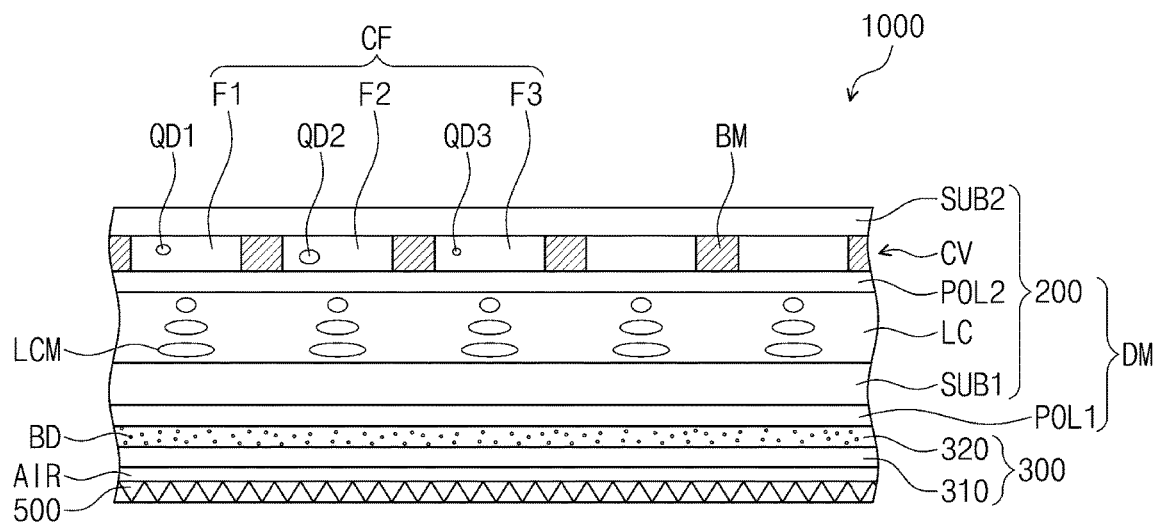
FIG. 4 is an enlarged cross-sectional view showing the display apparatus shown in FIG. 2.

FIG. 4 is an enlarged cross-sectional view showing the display apparatus shown in FIG. 2.

Referring to FIG. 4, the display module DM includes a display member 200 and a first polarizing layer POL1.

The first polarizing layer POL1 is disposed between the display member 200 and the backlight unit BLU to polarize the light provided from the backlight unit BLU. The first polarizing layer POL1 may have a transmission axis (not shown) in a predetermined direction.

The display member 200 is disposed on the first polarizing layer POL1 to display the image through the display area DA. In an exemplary embodiment, the display member 200 may be, but not limited to, a light-receiving type display panel, for example. In an exemplary embodiment, the display member 200 may be a liquid crystal display ("LCD") panel, for example.

The display member 200 includes a first substrate SUB1, a second substrate SUB2, a liquid crystal layer LC, a light conversion layer CV, and a second polarizing layer POL2.

The first substrate SUB1 is disposed on the first polarizing layer POL1. The first substrate SUB1 may include a material having high light transmittance to easily transmit the light from the backlight unit BLU. In an exemplary embodiment, the first substrate SUB1 may be a transparent glass substrate, a transparent plastic substrate, or a transparent film, for example.

Although not shown in drawings, the first substrate SUB1 includes at least one pixel area (not shown) and a peripheral area (not shown) adjacent to the pixel area, which are defined in the first substrate SUB1 when viewed in a plan view. In an exemplary embodiment, the pixel area (not shown) may be provided in a plural number, and the peripheral area (not shown) may be defined between the pixel areas.

Pixels (not shown) are respectively disposed in the pixel areas (not shown) of the first substrate SUB1. The pixels (not shown) include a plurality of pixel electrodes (not shown) and a plurality of thin film transistors ("TFTs") (not shown) electrically connected to the pixel electrodes in a one-to-one correspondence. The TFTs are respectively connected to the pixel electrodes to switch a driving signal applied to each pixel electrode.

The second substrate SUB2 is disposed above the first substrate SUB1 to face the first substrate SUB1. The liquid crystal layer LC is interposed between the second substrate SUB2 and the first substrate SUB1. The liquid crystal layer LC includes a plurality of liquid crystal molecules LCM aligned in a predetermined direction.

The second substrate SUB2 may include a common electrode (not shown) that generates an electric field with the pixel electrodes to control the alignment of the liquid crystal molecules LCM. The display member 200 drives the liquid crystal layer LC to display the image to the third direction DR3 that is the upper direction.

Although not shown in drawings, the display member 200 may include a driving chip generating the driving signal, a tape carrier package on which the driving chip is disposed (e.g., mounted), and a printed circuit board electrically connected to the display member 200 through the tape carrier package.

The second polarizing layer POL2 is disposed between the liquid crystal layer LC and the second substrate SUB2. The second polarizing layer POL2 may have an absorption axis in a predetermined direction. When the display apparatus 1000 is in a bright state, the second polarizing layer POL2 transmits the light, and when the display apparatus 1000 is in a dark state, the second polarizing layer POL2 absorbs the light.

An angle between the transmission axis of the first polarizing layer POL1 and the absorption axis of the second polarizing layer POL2 may be determined depending on the alignment mode of the liquid crystal molecules LCM. In an exemplary embodiment, the transmission axis of the first polarizing layer POL1 may be substantially perpendicular to the absorption axis of the second polarizing layer POL2 when viewed in a plan view, for example.

The light conversion layer CV is disposed between the second substrate SUB2 and the common electrode (not shown). That is, the light conversion member CV is disposed between the second substrate SUB2 and the second polarizing layer POL2. The light conversion member CV includes a plurality of conversion filters CF and a black matrix BM.

The conversion filters CF may change a color of the light or transmit the light without changing the color of the light in accordance with an energy of the light incident thereto. A first light generated by the light source LS is converted to various lights having various colors by the light conversion member CV and implemented as the image.

The conversion filters CF may include a plurality of light conversion particles. Each light conversion particle absorbs at least a portion of the light incident thereto to emit a light having a specific color or to transmit the light without changing the color of the light. In a case that the light incident to the conversion filters CF has the energy enough to excite the light conversion particles, the light conversion particles are excited by absorbing at least the portion of the light incident to the light conversion particles, and then the excited state of the light conversion particles return to a stable state to emit the light having the specific color. Differently from the above, in a case that the light incident to the conversion filters CF has an energy not enough to excite the light conversion particles, the incident light may be perceived by outside observers after passing through the conversion filters CF without being changed.

The color of the light emitted from the light conversion particles may be determined depending on a particle size of the light conversion particles. As the particle size increases, the wavelength of the light becomes longer, and as the particle size decreases, the wavelength of the light becomes shorter. In the illustrated exemplary embodiment, the light conversion particles may be quantum dots.

The light emitted from the conversion filter CF travels in various directions. Accordingly, the light generated by the conversion filter CF may travel to the second substrate SUB2 and the black matrix BM.

According to the illustrated exemplary embodiment, the conversion filters CF include a first conversion filter F1, a second conversion filter F2, and a third conversion filter F3. The black matrix BM is disposed between the first conversion filter F1, the second conversion filter F2, and the third conversion filter F3 to define a boundary between the first conversion filter F1, the second conversion filter F2, and the third conversion filter F3.

The first conversion filter F1 and the second conversion filter F2 may convert the light incident to the light conversion member CV to lights having different wavelength ranges from each other.

The first conversion filter F1 absorbs the first light to convert the first light to a second light having a peak wavelength in a second wavelength range. In an exemplary embodiment, the second wavelength range is in a range equal to or greater than about 480 nm and equal to or smaller than about 560 nm, for example. That is, the first conversion filter F1 may convert a blue light to a green light.

The second conversion filter F2 absorbs the first light to convert the first light to a third light having a peak wavelength in a third wavelength range. In an exemplary embodiment, the third wavelength range is in a range equal to or greater than about 640 nm and equal to or smaller than about 780 nm, for example. That is, the second conversion filter F2 may convert the blue light to a red light.

The third conversion filter F3 may be a colorless filter or a gray filter. In a case that the light source LS generated the light having the blue color, the third conversion filter F3 emits the light having blue color even though the third conversion filter F3 transmits the light incident thereto without changing the color of the light generated by the light source LS. In this case, the third conversion filter F3 may include various materials as long as the third conversion filter F3 transmits at least a portion of the light incident thereto and should not be limited to a specific exemplary embodiment.

As described above, the wavelength of the light may be determined depending on the particle size of the quantum dot. Accordingly, among the first, second, and third conversion filters F1, F2, and F3, the second conversion filter F2 includes the quantum dot QD2 having the largest size greater than that of the quantum dot QD1 of the first conversion filter F1 and that of the quantum dot QD3 of the third conversion filter F3, and the quantum dot QD3 has the smallest size. According to another exemplary embodiment of the invention, the third conversion filter F3 may not include the quantum dot.

The black matrix BM is adjacent to the conversion filter CF. The black matrix BM may include a light blocking material. The black matrix BM may have a shape corresponding to that of the peripheral area (not shown). The black matrix BM may prevent a light leakage from occurring in an area except for the pixel area (not shown) through which the light travels and clarify the boundary between the pixel areas adjacent to each other.

An air layer AIR may further be provided between the transmission filter layer 310 and the light condensing member 500.

Figure 5:
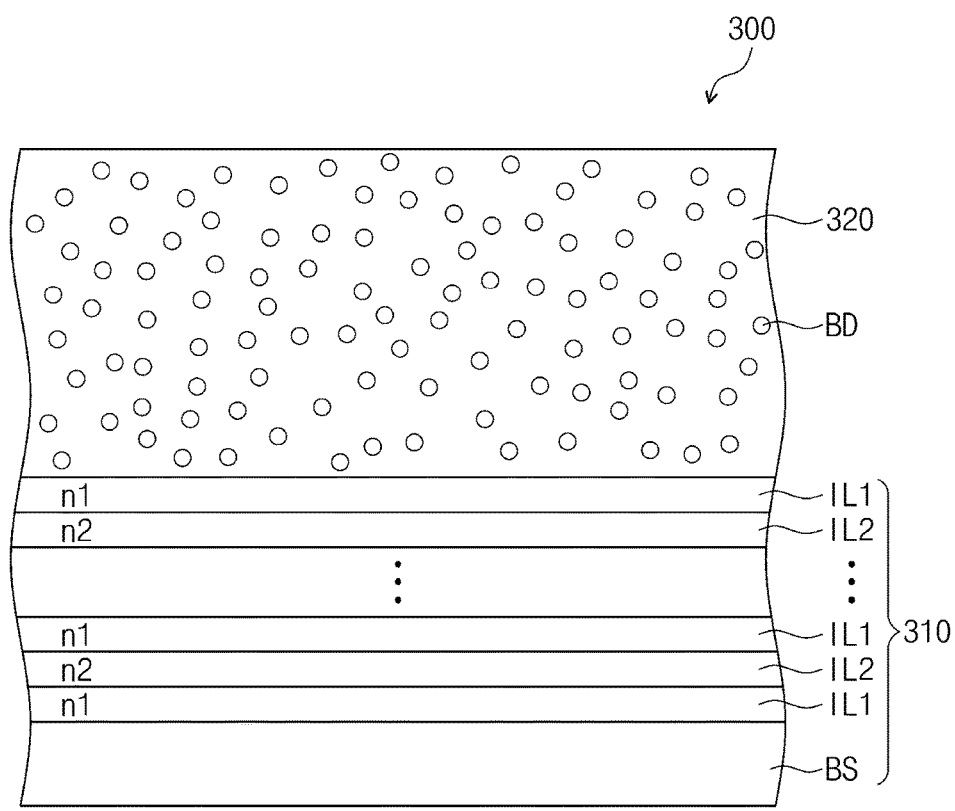
FIG. 5 is an enlarged cross-sectional view of an optical filter.

FIG. 5 is an enlarged cross-sectional view of the optical filter 300.

Referring to FIG. 5, the optical filter 300 according to the illustrated exemplary embodiment includes the transmission filter layer 310 and the viewing angle control layer 320.

The transmission filter layer 310 includes a base substrate BS and a plurality of insulating layers disposed on the base substrate BS. The insulating layers include a first insulating layer IL1 and a second insulating layer IL2. Each of the first insulating layer IL1 and the second insulating layer IL2 may be provided in a plural number, and the first insulating layers IL1 may be alternately stacked with the second insulating layers IL2.

The first insulating layer IL1 and the second insulating layer IL2 have different refractive indices from each other. The first insulating layer IL1 has a first refractive index n1, and the second insulating layer IL2 has a second refractive index n2. The transmission filter layer 310 may have a first effective refractive index N1 since the first insulating layers IL1 are alternately stacked with the second insulating layer IL2.

According to the illustrated exemplary embodiment, it is preferred that a difference (n) between the first refractive index n1 and the second refractive index n2 is reduced. In an exemplary embodiment, the first effective refractive index N1 of the transmission filter layer 310 may be in a range equal to or greater than about 1.7 and equal to or smaller than about 2.2, for example. In an exemplary embodiment, the difference (n) between the first refractive index n1 and the second refractive index n2 may be equal to or greater than about zero (0) and equal to or smaller than about 0.5, for example. This will be described in detail later.

According to the illustrated exemplary embodiment, the first insulating layer IL1 may include titanium dioxide ($TiO_2$), and the second insulating layer IL2 may include silicon dioxide ($SiO_2$), for example. However, the first and second insulating layers IL1 and IL2 should not be limited thereto or thereby.

Each of the first and second insulating layers IL1 and IL2 may have a thickness along a cross-sectional direction determined depending on the refractive index thereof. In an exemplary embodiment, when a center wavelength of the light incident to the transmission filter layer 310 is referred to as "λ,", the thickness of each first insulating layer IL1 is about λ/4n1, and the thickness of each second insulating layer IL2 is about λ/4n2, for example.

Accordingly, the number of the first insulating layers IL1 and the number of the second insulating layers IL2 of the transmission filter layer 310 may be determined depending on the thickness of each of the first and second insulating layers IL1 and IL2. In an exemplary embodiment, each of the first and second insulating layers IL1 and IL2 may be provided in twenty layers or less, for example.

The viewing angle control layer 320 is disposed on the transmission filter layer 310. The viewing angle control layer 320 may have a second effective refractive index N2. The second effective refractive index N2 may be equal to or smaller than the first effective refractive index N1. According to the exemplary embodiment, it is preferred that a difference (N) between the first effective refractive index N1 and the second effective refractive index N2 is reduced. In an exemplary embodiment, the second effective refractive index N2 may be greater than about 1.0, for example.

According to the illustrated exemplary embodiment, the viewing angle control layer 320 may include an adhesive material. Accordingly, the viewing angle control layer 320 may attach the transmission filter layer 310 to the first polarizing layer POL1. In an exemplary embodiment, the viewing angle control layer 330 may include an optically clear adhesive ("OCA") or silicon, for example.

In addition, according to the exemplary embodiment, the viewing angle control layer 320 may include a plurality of beads BD. The level of the second effective refractive index N2 may be controlled by a content of the beads BD.

Figure 6A:
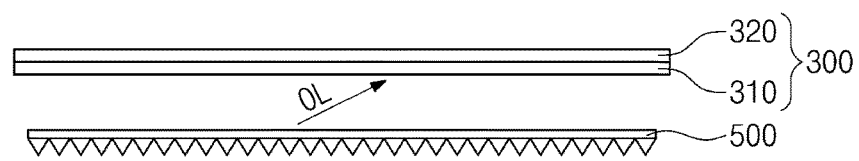
FIG. 6A is a cross-sectional view schematically showing an emission light emitted from the backlight unit.
Figure 6A:
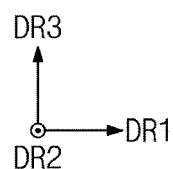
Figure 6B:
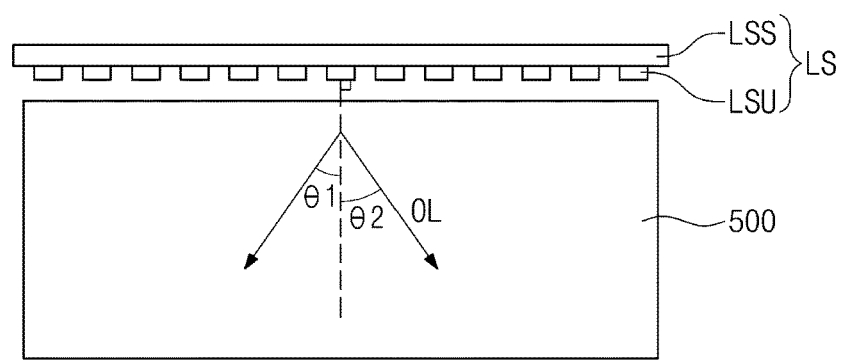
FIG. 6B is a plan view schematically showing the emission light emitted from the backlight unit.
Figure 6B:
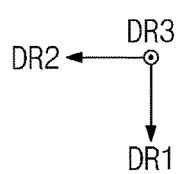

FIG. 6A is a cross-sectional view schematically showing an emission light emitted from the backlight unit BLU, and FIG. 6B is a plan view schematically showing the emission light emitted from the backlight unit BLU.

Referring to FIGS. 6A and 6B, the light emitted from the backlight unit BLU and incident to the optical filter 300 is referred to as an emission light OL, and an angle between the emission light OL and the first direction DR1 is referred to as an emission angle θ1, θ2. The first direction DR1 is substantially parallel to a front light exit direction of the light source unit LSU. The emission light OL may be incident to the optical filter 300 with various emission angles.

According to the illustrated exemplary embodiment, a light amount of the first light transmitting through the optical filter 300 may vary in accordance with the emission angle θ1, θ2 of the emission light OL. This will be described in detail with reference to the accompanying drawings.

Figure 7A:
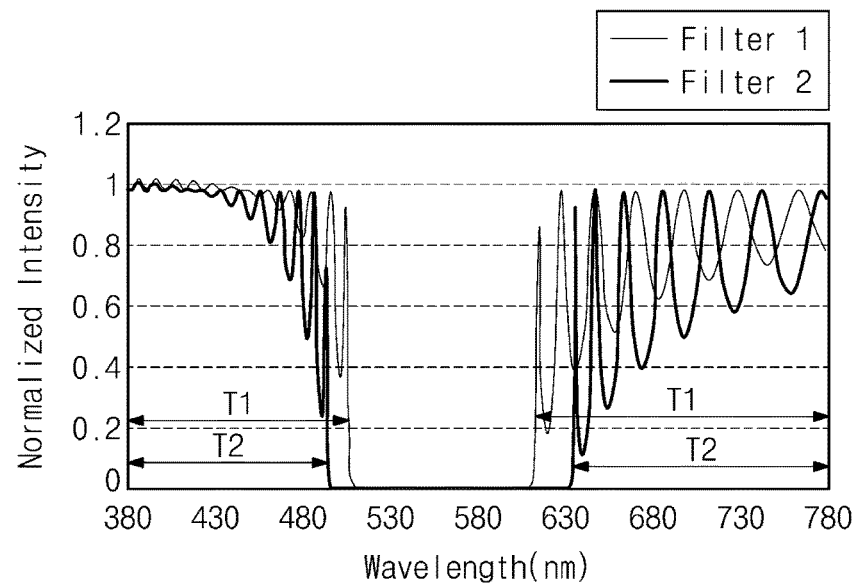
FIG. 7A is a graph showing a wavelength range of a light passing through a transmission filter layer.
Figure 7B:
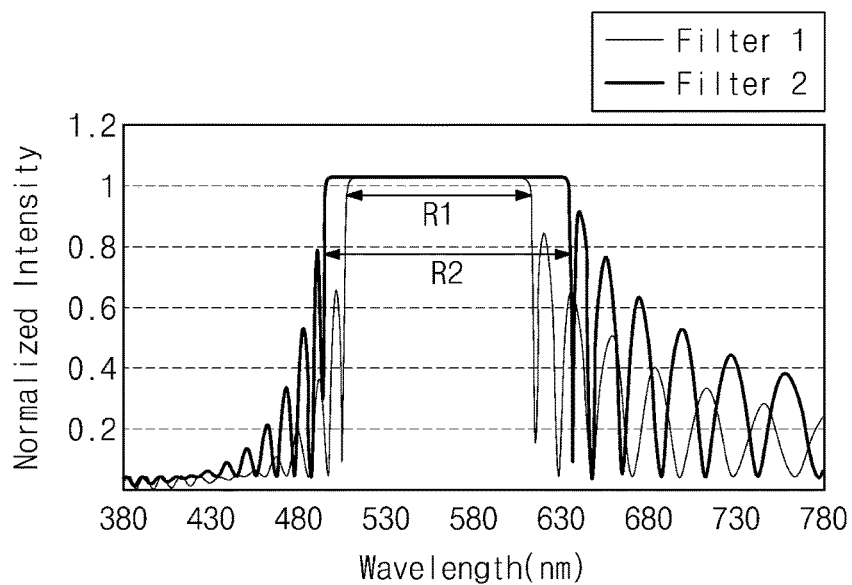
FIG. 7B is a graph showing a wavelength range of a light reflected by the transmission filter layer.

FIG. 7A is a graph showing a wavelength range of a light passing through a transmission filter layer, and FIG. 7B is a graph showing a wavelength range of a light reflected by the transmission filter layer.

In an exemplary embodiment, the transmission filter layer 310 may be, but not limited to, a distributed Bragg reflector ("DBR"), for example. That is, the transmission filter layer 310 may control the wavelength range of the light transmitting therethrough and the wavelength range of the light reflected thereby on the basis of Bragg's law.

Referring to FIGS. 4, 7A, and 7B, a portion of the light incident to the transmission filter layer 310 transmits through the transmission filter layer 310 and the other portion of the light incident to the transmission filter layer 310 is reflected by the transmission filter layer 310. In detail, among the light incident to the transmission filter layer 310, the light having the wavelength range overlapped with transmission wavelength ranges T1 and T2 of the transmission filter layer 310 transmits through the transmission filter layer 310, and the light having the wavelength range overlapped with reflection wavelength ranges R1 and R2 of the transmission filter layer 310 is reflected by the transmission filter layer 310. When the transmittance of the transmission filter layer 310 with respect to the light incident to the transmission filter layer 310 is referred to as "TR" and a reflectance of the transmission filter layer 310 with respect to the light incident to the transmission filter layer 310 is referred to as "RE", "RE" and "TR" have the following relation of TR=|1−RE|.

As shown in FIG. 7A, the transmission wavelength ranges T1 and T2 of the transmission filter layer 310 may be overlapped with the first wavelength range and the third wavelength range. That is, the transmission filter layer 310 may transmit the blue light and the red light.

As shown in FIG. 7B, the reflection wavelength ranges R1 and R2 of the transmission filter layer 310 may be overlapped with the second wavelength range. That is, the transmission filter layer 310 may reflect the green light.

Consequently, in the case that the first light generated by the light source LS is incident to the transmission filter layer 310, the transmission filter layer 310 transmits the light (e.g., blue light) in the transmission wavelength ranges T1 and T2 overlapped with the first wavelength range and reflects the light (e.g., green light) in the reflection wavelength ranges R1 and R2 overlapped with the second wavelength range.

According to the illustrated exemplary embodiment, the transmission wavelength ranges T1 and T2 and the reflection wavelength ranges R1 and R2 of the transmission filter layer 310 may be determined depending on the difference (n) in refractive index between the first insulating layer IL1 (refer to FIG. 5) and the second insulating layer IL2 (refer to FIG. 5), the difference in thickness between the first insulating layer IL1 and the second insulating layer IL2, and the number of the first and second insulating layers IL1 and IL2.

In this case, in the case that the wavelength range of the first light provided from the light source LS is overlapped with the reflection wavelength ranges R1 and R2 of the transmission filter layer 310, a width of the wavelength range of the light transmitting through the transmission filter layer 310 may become narrower. This is referred to as a "cut-off", and a wavelength range in which the wavelength range of the first light is overlapped with the reflection wavelength ranges R1 and R2 is referred to as a "cut-off amount".

FIGS. 7A and 7B respectively show transmission and reflection graphs of the first transmission filter layer (Filter 1) and the second transmission filter layer (Filter 2) having different refractive index differences (n) from each other. The transmission filter layer 310 has the reflection wavelength range becoming wider as the refractive index difference (n) of the transmission filter layer 310 increases.

For the convenience of explanation, the transmission filter layer 310 in which the refractive index difference (n) of each of the first and second insulating layers IL1 and IL2 is set to about 0.5 is referred to as the first transmission filter layer (Filter 1) and the transmission filter layer 310 in which the refractive index difference (n) of each of the first and second insulating layers IL1 and IL2 is set to about 0.7 is referred to as the second transmission filter layer (Filter 2).

The first transmission filter layer (Filter 1) has a first reflection wavelength range R1, and the second transmission filter layer (Filter 2) has a second reflection wavelength range R2. The first reflection wavelength range R1 has a width narrower than a width of the second reflection wavelength range R2. That is, the light reflected by the first transmission filter layer (Filter 1) has the wavelength range narrower than the wavelength range of the light reflected by the second transmission filter layer (Filter 2).

Accordingly, the wavelength range in which the wavelength range of the first light is overlapped with the first reflection wavelength range R1 may be smaller than the wavelength range in which the wavelength range of the first light is overlapped with the second reflection wavelength range R2. That is, the first transmission filter layer (Filter 1) may have the cut-off amount smaller than that of the second transmission filter layer (Filter 2) with respect to the light source LS.

Figure 8A:
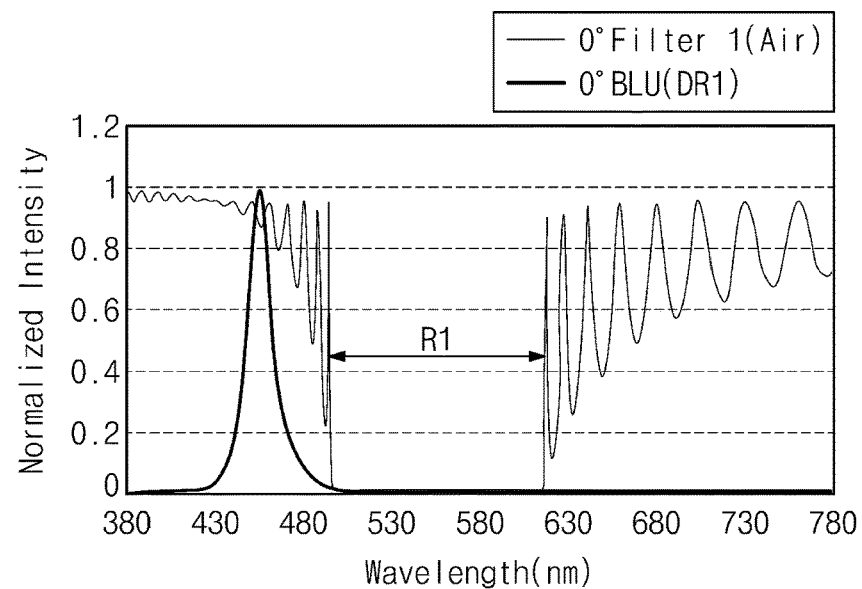
FIG. 8A is a graph showing a transmittance of a first transmission filter layer with respect to a light emitted from the backlight unit at an emission angle of about zero (0) degree and incident to the first transmission filter layer.
Figure 8B:
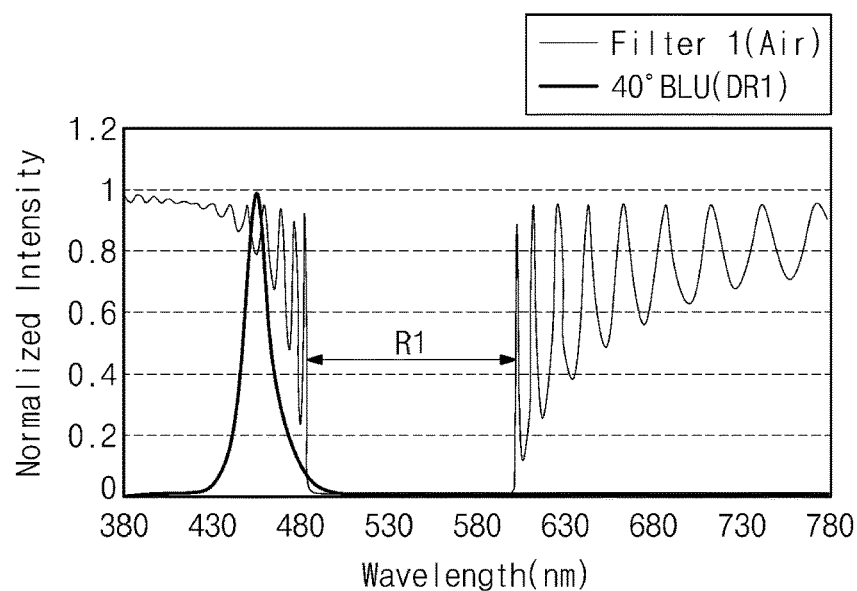
FIG. 8B is a graph showing a transmittance of the first transmission filter layer with respect to a light emitted from the backlight unit at an emission angle of about 40 degrees and incident to the first transmission filter layer.

FIG. 8A is a graph showing a transmittance of the first transmission filter layer with respect to a light emitted from the backlight unit at the emission angle of about zero (0) degree and incident to the first transmission filter layer, and FIG. 8B is a graph showing a transmittance of the first transmission filter layer with respect to a light emitted from the backlight unit at the emission angle of about 40 degrees and incident to the first transmission filter layer.

Figure 9A:
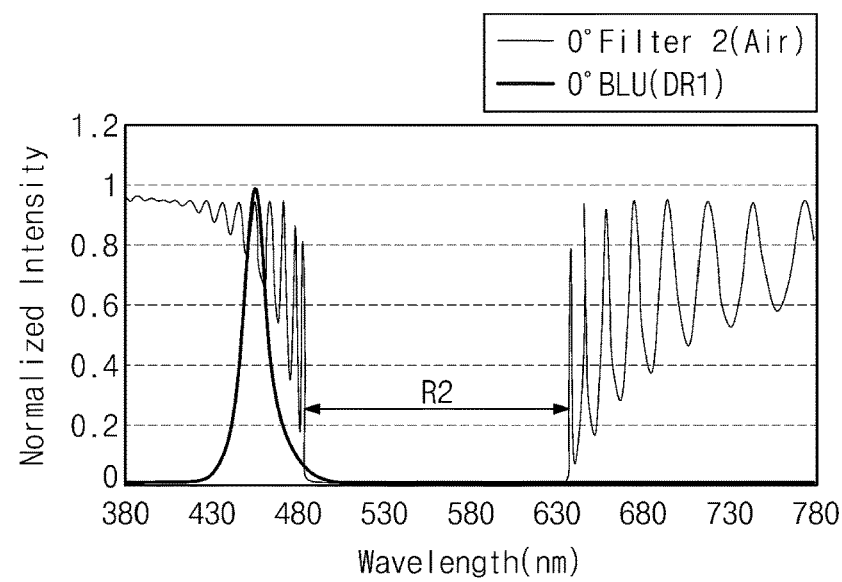
FIG. 9A is a graph showing a transmittance of a second transmission filter layer with respect to a light emitted from the backlight unit at an emission angle of about zero (0) degree and incident to the second transmission filter layer.
Figure 9B:
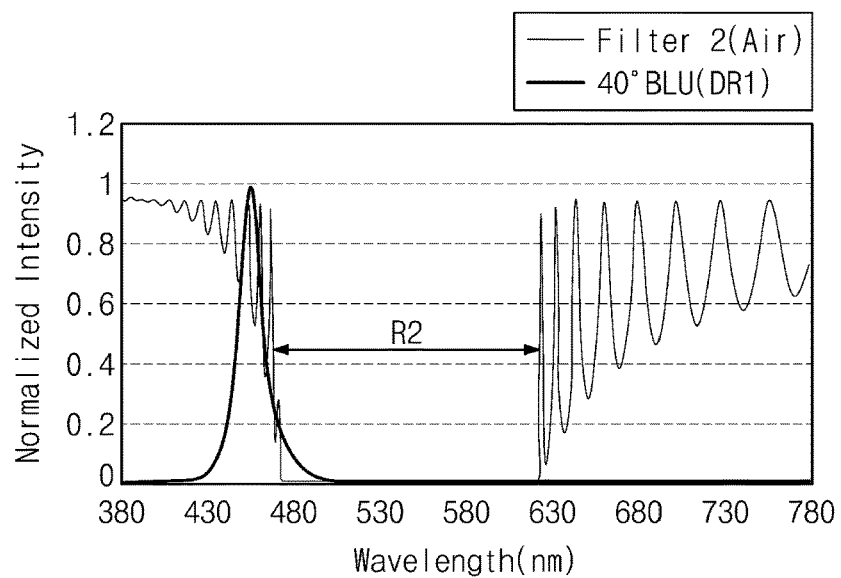
FIG. 9B is a graph showing a transmittance of the second transmission filter layer with respect to a light emitted from the backlight unit at an emission angle of about 40 degrees and incident to the second transmission filter layer.

FIG. 9A is a graph showing a transmittance of the second transmission filter layer with respect to a light emitted from the backlight unit at an emission angle of about zero (0) degree and incident to the second transmission filter layer, and FIG. 9B is a graph showing a transmittance of the second transmission filter layer with respect to a light emitted from the backlight unit at an emission angle of about 40 degrees and incident to the second transmission filter layer.

Referring to FIGS. 8A, 8B, 9A, and 9B, the center wavelength λ of the light reflected by the transmission filter layer 310 is reduced as the emission angle θ1, θ2 increases. That is, as the emission angle θ1, θ2 increases, the reflection wavelength ranges R1 and R2 may move such that the center wavelength of the light reflected by the transmission filter layer 310 is closer to the center wavelength of the first light. In this case, the width of the reflection wavelength ranges R1 and R2 is not reduced.

As described above, a phenomenon in which the reflection wavelength ranges R1 and R2 move as the emission angle θ1, θ2 increases is referred to as a "blue-shift", and a degree of the movement of the reflection wavelength ranges R1 and R2 is referred to as a "blue-shift amount". According to the illustrated exemplary embodiment, the cut-off amount increases as the blue-shift amount increases.

Figure 10:
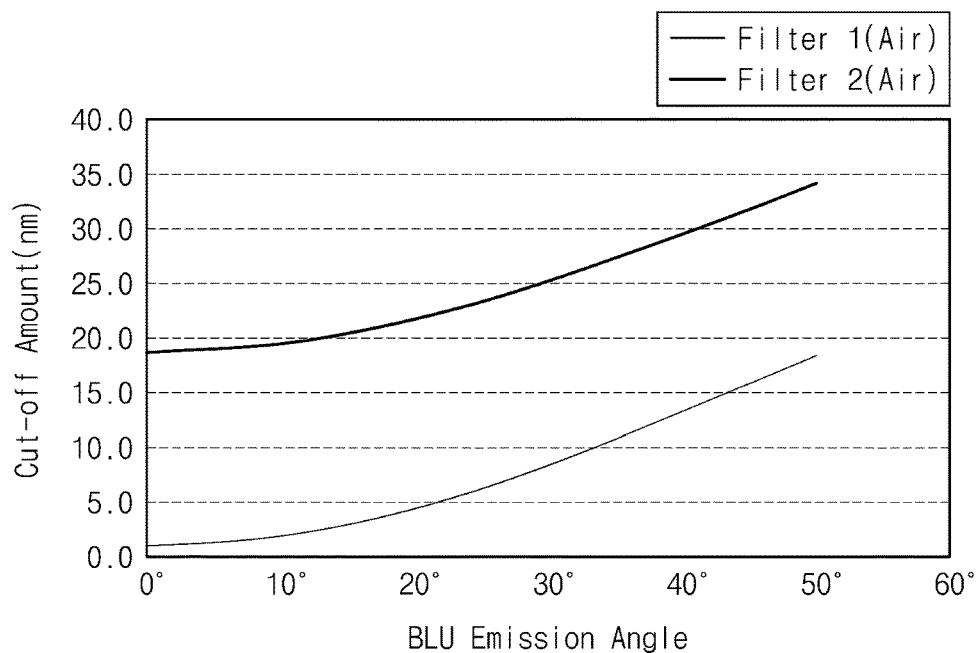
FIG. 10 is a graph showing a cut-off amount when the light exiting from the first and second transmission filter layers passes through an air layer.

FIG. 10 is a graph showing the cut-off amount when the light exiting from the first and second transmission filter layers passes through an air layer AIR (refer to FIGS. 2 and 4).

As shown in FIGS. 8A, 8B, and 10, the blue-shift amount of the first transmission filter layer (Filter 1) may increase as the emission angle θ1, θ2 increases from about 0 degree to about 40 degrees. That is, the cut-off amount when the emission angle θ1, θ2 is about 40 degrees may be greater than the cut-off amount when the emission angle θ1, θ2 is about 0 degree. In an exemplary embodiment, the cut-off amount of the first transmission filter layer (Filter 1) is about 1 nm when the emission angle θ1, θ2 is about 0 degree, and the cut-off amount of the first transmission filter layer (Filter 1) is about 13 nm when the emission angle θ1, θ2 is about 40 degrees, for example.

As shown in FIGS. 9A, 9B, and 10, the blue-shift amount of the second transmission filter layer (Filter 2) may increase as the emission angle θ1, θ2 increases from about 0 degree to about 40 degrees. That is, the cut-off amount when the emission angle θ1, θ2 is about 40 degrees may be greater than the cut-off amount when the emission angle θ1, θ2 is about 0 degree. In an exemplary embodiment, the cut-off amount of the second transmission filter layer (Filter 2) is about 19 nm when the emission angle θ1, θ2 is about 0 degree, and the cut-off amount of the second transmission filter layer (Filter 2) is about 29 nm when the emission angle θ1, θ2 is about 40 degrees, for example.

According to the illustrated exemplary embodiment, when the emission angle θ1, θ2 is about 0 degree, i.e., when the user sees the image from the front of the display apparatus 1000, the refractive index difference (n) between the insulating layers of the transmission filter layer 310 (refer to FIGS. 1, 2, 4, 5 and 6A) may be set such that an initial cut-off amount has a minimum value, and thus a transmission efficiency of the optical filter 300 (refer to FIGS. 1, 2, 4, 5 and 6A) is improved. That is, when the emission angle θ1, θ2 is about 0 degree, the width of the reflection wavelength ranges R1 and R2 may be set such that the reflection wavelength ranges R1 and R2 are not overlapped with the first wavelength range.

In an exemplary embodiment, in the case that the transmission filter layer 310 has the first reflection wavelength range, the transmission efficiency of the transmission filter layer 310 with respect to the first light may be higher than that of the transmission filter layer 310 when the transmission filter layer 310 has the second reflection wavelength range, for example. As described above, the difference (n) between the first refractive index n1 and the second refractive index n2 of the transmission filter layer 310 having the first reflection wavelength range may be equal to or greater than about 0 and equal to or smaller than about 0.5.

Figure 11:
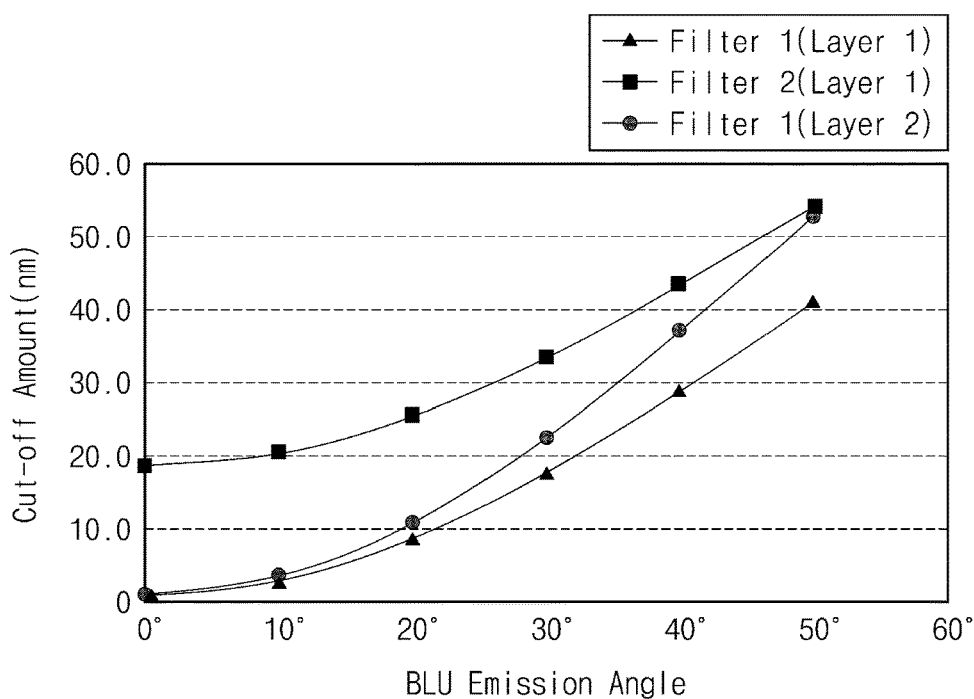
FIG. 11 is a graph showing a cut-off amount when the light exiting from the first and second transmission filter layers passes through a viewing angle control layer.
Figure 12A:
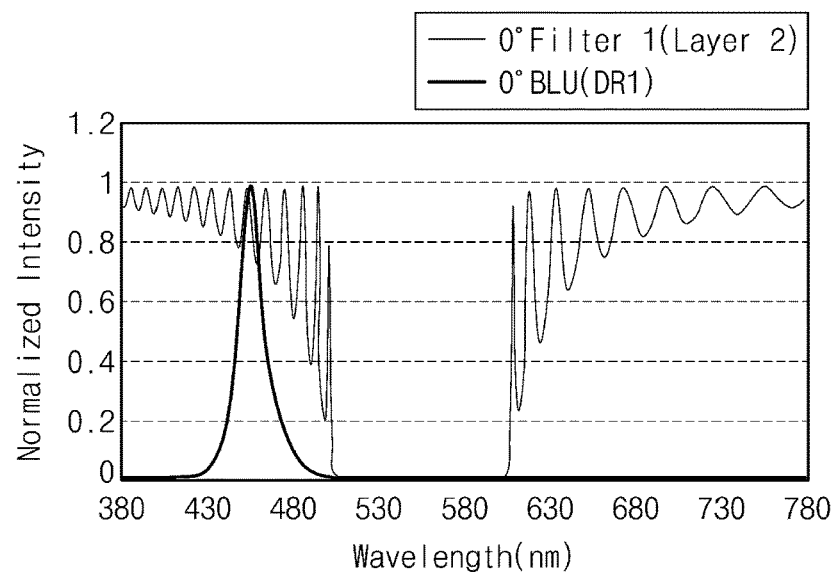
FIGS. 12A to 12D are graphs showing a transmittance of a light passing through a transmission filter layer and a viewing angle control layer as a function of a viewing angle.
Figure 12B:
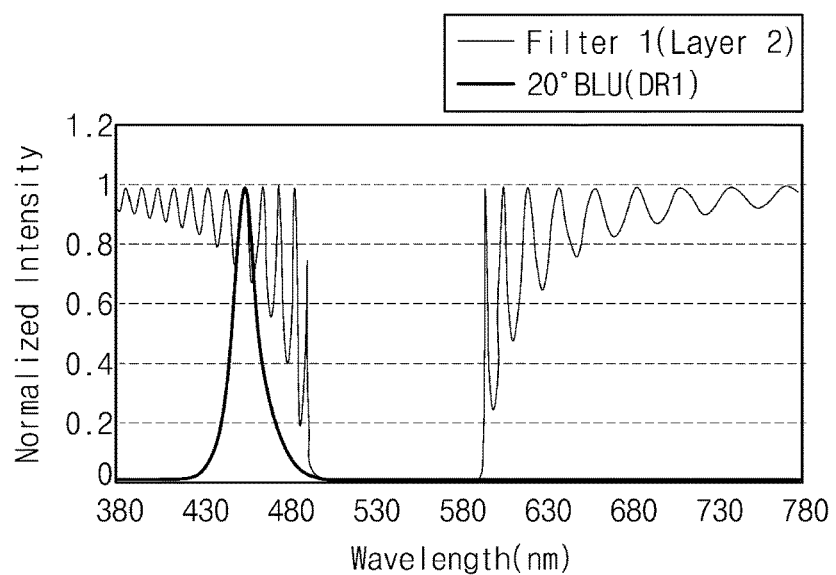
Figure 12C:
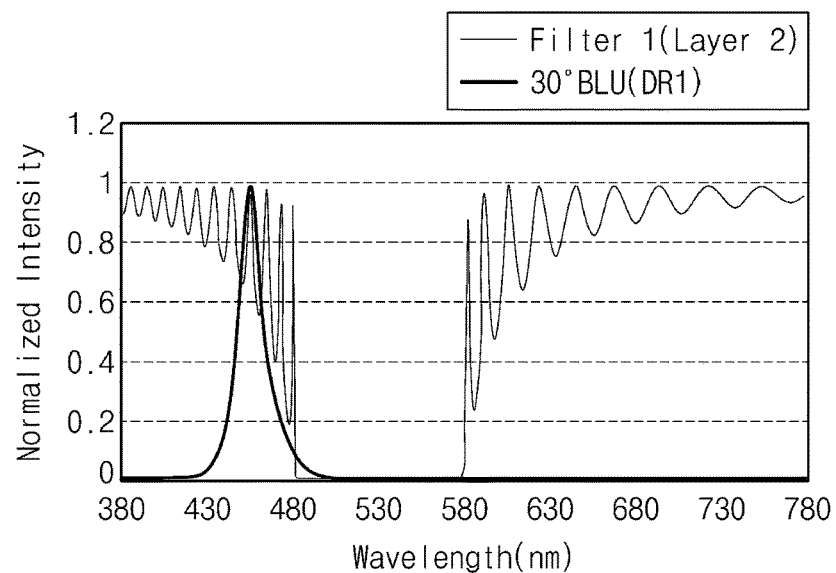
Figure 12D:
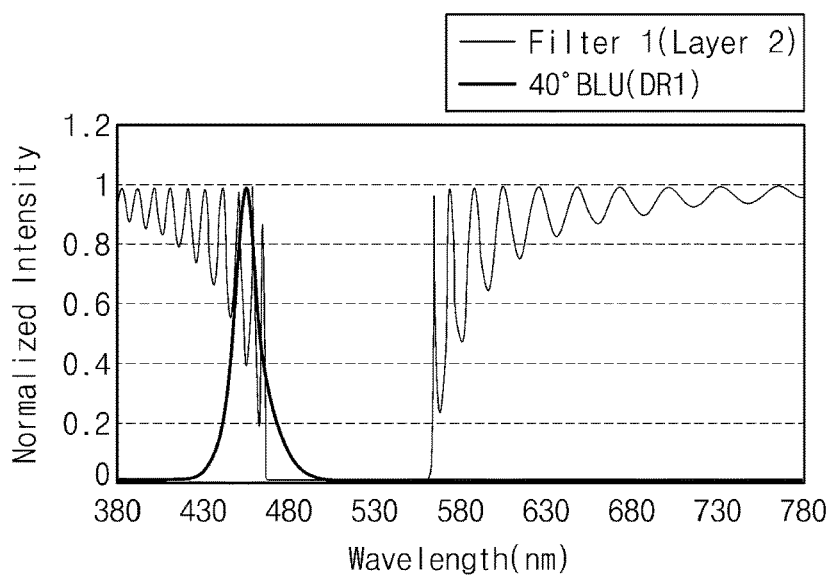

FIG. 11 is a graph showing the cut-off amount when the light exiting from the first and second transmission filter layers passes through a viewing angle control layer.

The light emitted from the backlight unit BLU is incident to the transmission filter layer 310 (refer to FIGS. 1, 2, 4, 5 and 6A), and the incident light transmits through the viewing angle control layer 320 (refer to FIGS. 1, 2, 4, 5 and 6A) after passing through the transmission filter layer 310. According to the illustrated exemplary embodiment, the blue-shift amount of the light passing through the optical filter 300 (refer to FIGS. 1, 2, 4, 5 and 6A) according to the emission angle θ1, θ2 may increases as the difference (N) of the effective refractive index between the transmission filter layer 310 and the viewing angle control layer 320 decreases. That is, a variation in the cut-off amount of the optical filter 300 in accordance with the emission angle θ1, θ2 may increase as the difference (N) of the effective refractive index between the transmission filter layer 310 and the viewing angle control layer 320 decreases.

For the convenience of explanation, the viewing angle control layer 320 having the refractive index of about 1.5 is referred to as a "first viewing angle control layer" (Layer 1), and the viewing angle control layer 320 having the refractive index of about 1.7 is referred to as a "second viewing angle control layer" (Layer 2). As described above, the first effective refractive index is equal to or greater than about 1.7 and equal to or smaller than about 2.2, and a difference in effective refractive index between the first transmission filter layer (Filter 1) and the first viewing angle control layer (Layer 1) is greater than a difference in effective refractive index between the first transmission filter layer (Filter 1) and the second viewing angle control layer (Layer 2).

In the case that the light incident to the first transmission filter layer (Filter 1) transmits through the first viewing angle control layer (Layer 1), the cut-off amount of the optical filter 300 is about 1 nm when the emission angle θ1, θ2 is about 0 degree, and the cut-off amount of the optical filter 300 is about 28 nm when the emission angle θ1, θ2 is about 40 degrees as described above.

In the case that the light incident to the first transmission filter layer (Filter 1) transmits through the second viewing angle control layer (Layer 2), the cut-off amount of the optical filter 300 is about 37 nm when the emission angle θ1, θ2 is about 40 degrees.

According to the illustrated exemplary embodiment, the variation of the cut-off amount according to the emission angle θ1, θ2 may be set to be large. As the emission angle θ1, θ2 increases, the effective refractive index N may be set to be small such that the wavelength range in which the reflection wavelength ranges R1 and R2 are overlapped with the first wavelength range increases. As an ideal example, the effective refractive index N2 of the viewing angle control layer 320 may be equal to or greater than about 1.5.

FIGS. 12A to 12D are graphs showing a transmittance of a light passing through a transmission filter layer and a viewing angle control layer as a function of a viewing angle.

Differently from the aforementioned exemplary embodiment, in the case that the display apparatus 1000 is in a dark state, a front contrast ratio of the display apparatus 1000 may vary depending on the emission angles θ1 and θ2 of an emission light OL (refer to FIGS. 6A and 6B). In detail, the second polarizing layer POL2 of the display module DM may not absorb the emission light OL with large emission angle among the light reaching to the second polarizing layer POL2 after passing through the optical filter 300. The emission light OL that is not absorbed by the second polarizing layer POL2 may be absorbed by the light conversion member CV and travels in all directions by the light conversion particles. In the case that the display apparatus 1000 is in a dark state, the front contrast ratio may be lowered by the light traveling in the front direction among the light traveling in all directions. However, according to the illustrated exemplary embodiment, as shown in FIGS. 12A to 12D, since the first effective refractive index N1 of the transmission filter layer 310 is set to be smaller than the second effective refractive index N2, the cut-off amount of the emission light OL with the large emission angle θ1, θ2 may increase. That is, in the display apparatus 1000 is in the dark state, the light amount of the emission light OL with the large emission angle θ1, θ2 may decrease. In addition, as shown in FIGS. 12A to 12D, the transmission filter layer 310 according to the illustrated exemplary embodiment has the refractive index difference (n) that is small, and thus the light amount of the emission light OL with the small emission angle θ1, θ2 may increase. That is, the transmission efficiency of the emission light OL with the small emission angle θ1, θ2 may be maximized.

Consequently, according to the illustrated exemplary embodiment, the front contrast ratio may be improved when the display apparatus 1000 is in the dark state. In addition, the front contrast ratio may be improved in the dark state since a conventional air gap is replaced with the viewing angle control layer 320. Further, since the air gap is omitted from the display apparatus 1000, an assemblability of the display apparatus 1000 may be improved.

Figure 13:
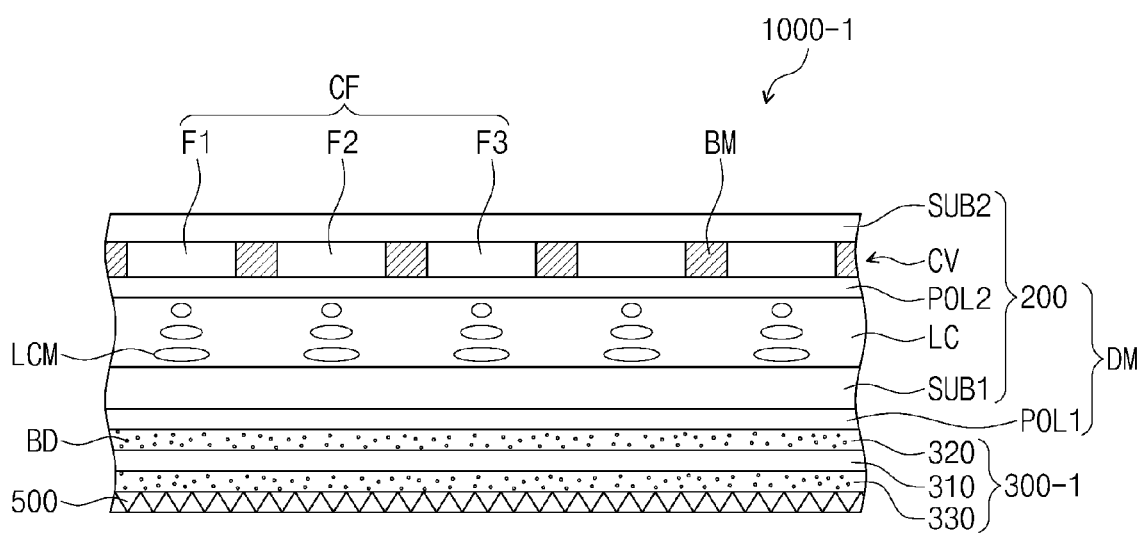
FIG. 13 is an enlarged cross-sectional view showing another exemplary embodiment of a display apparatus according to the invention.

FIG. 13 is an enlarged cross-sectional view showing a display apparatus 1000-1 according to another exemplary embodiment of the invention.

For the convenience of explanation, different features of the illustrated exemplary embodiment from the previously-mentioned embodiments will be mainly described, and components not described in the illustrated exemplary embodiment are substantially the same as those described in previously mentioned embodiments. In FIG. 13, the same reference numerals denote the same elements in FIGS. 1 to 12D, and thus detailed descriptions of the same elements will be omitted.

Referring to FIG. 13, an optical filter 300-1 further includes an adhesive member 330. The adhesive member 330 is disposed between a transmission filter layer 310 and a light condensing member 500 to attach the transmission filter layer 310 and the light condensing member 500.

In the illustrated exemplary embodiment, the adhesive member 330 may include the same material as that of a viewing angle control layer 320, but it should not be limited thereto or thereby.

According to the illustrated exemplary embodiment, since the air gap is omitted between the light condensing member 500 and the optical filter 300, the mold frame 700 may be omitted. According to the illustrated exemplary embodiment, assemblability and durability of the display apparatus 1000-1 may increase. In addition, a size of a bezel may be reduced since the mold frame is omitted from the display apparatus 1000-1.

Figure 14:
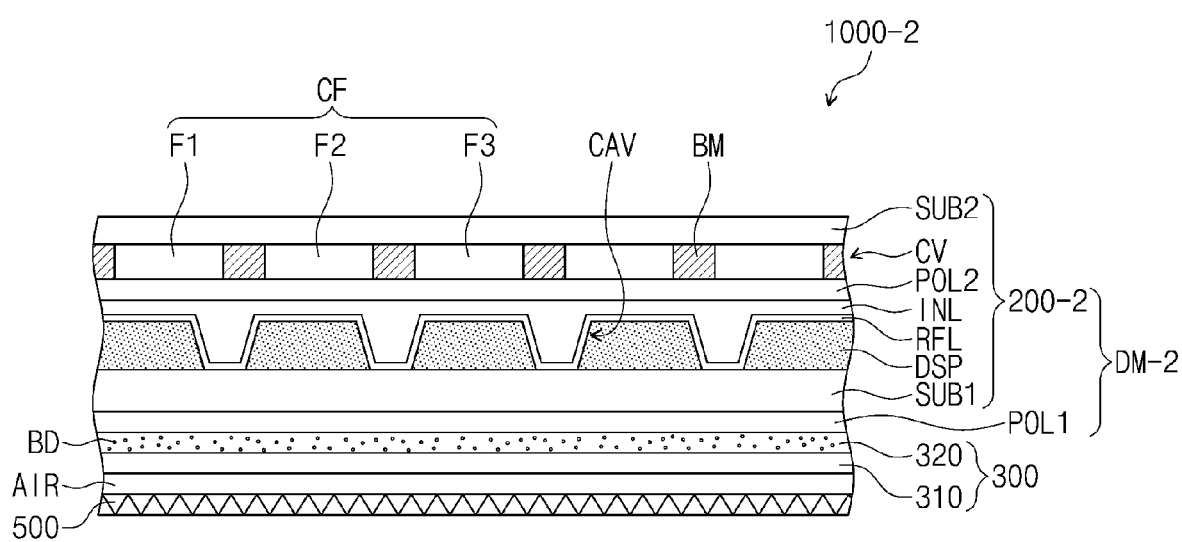
FIG. 14 is an enlarged cross-sectional view showing another exemplary embodiment of a display apparatus according to the invention.
Figure 15:
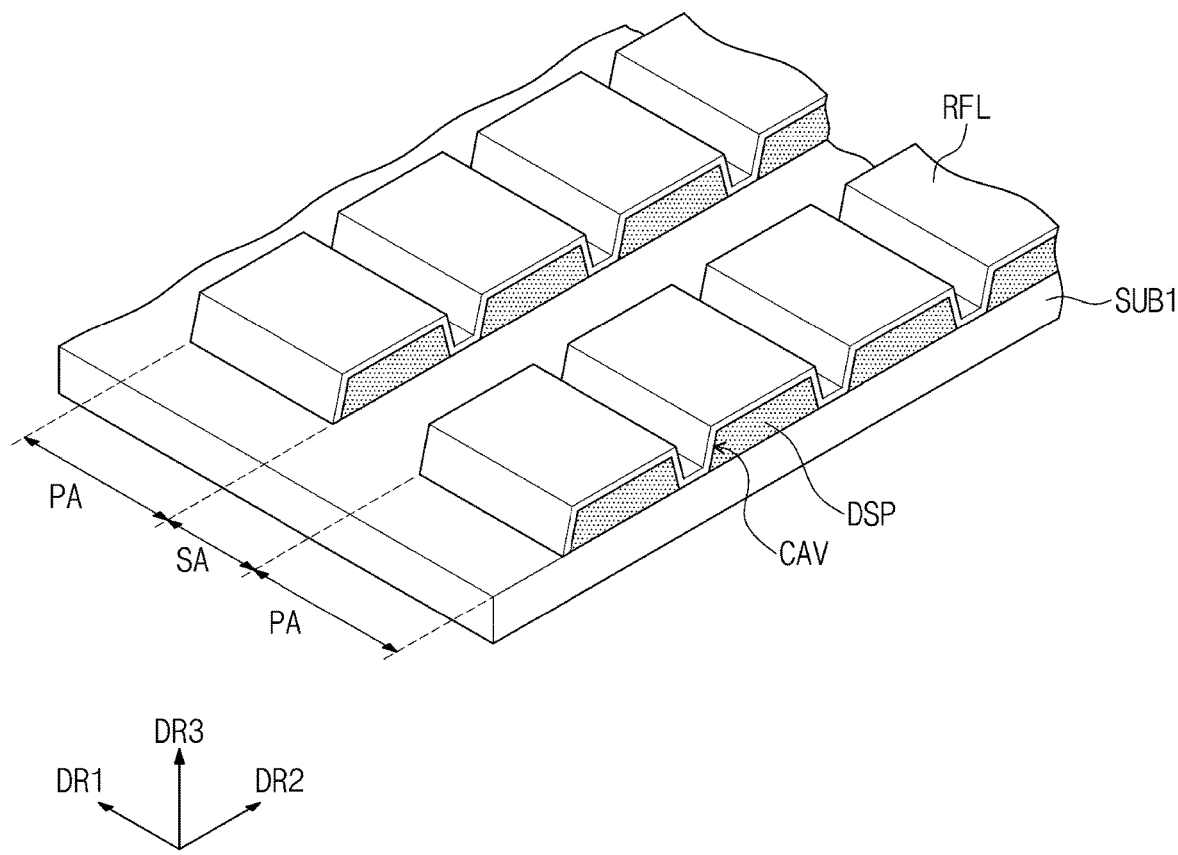
FIG. 15 is a perspective view showing display devices disposed on a first substrate shown in FIG. 13.

FIG. 14 is an enlarged cross-sectional view showing a display apparatus 1000-2 according to another exemplary embodiment of the invention, and FIG. 15 is a perspective view showing display devices DSP disposed on a first substrate shown in FIG. 13. In FIGS. 14 and 15, the same reference numerals denote the same elements in the previously-mentioned embodiments, and thus detailed descriptions of the same elements will be omitted.

Referring to FIGS. 14 and 15, a display member 200-2 of the display module DM-2 according to the illustrated exemplary embodiment may include a first substrate SUB1, a second polarizing layer POL2, a roof layer RFL, the display devices DSP, a light conversion member CV, and a second substrate SUB2. For the convenience of explanation, FIG. 15 schematically shows a perspective view of the display devices DSP disposed on the first substrate SUB1. Other components may further be disposed on the first substrate SUB1 in addition to the components shown in FIG. 15.

The first substrate SUB1 is disposed on the first polarizing layer POL1 as a base layer on which various devices are disposed. The first substrate SUB1 may include a material with high light transmittance to easily transmit a light provided from a backlight unit BLU. In an exemplary embodiment, the first substrate SUB1 may be a transparent glass substrate, a transparent plastic substrate, or a transparent film, for example.

The first substrate SUB1 includes at least one pixel area PA and a peripheral area SA adjacent to the pixel area PA when viewed in a plan view. In the illustrated exemplary embodiment, the pixel area PA is provided in a plural number, and the peripheral area SA is defined between the pixel areas.

The roof layer RFL is disposed on the first substrate SUB1. The roof layer RFL may be provided in a plurality number, and the roof layers RFL may be disposed on the same layer with each other, and may be arranged in the first direction DR1 to be spaced apart from each other. In the illustrated exemplary embodiment, only one roof layer RFL will be described as a representative example.

The roof layer RFL has a unitary shape extending in the second direction DR2. A portion of the roof layer RFL contacts the first substrate SUB1, and the other portion is spaced apart from the first substrate SUB1.

The roof layer RFL includes a plurality of portions. The portions include a plurality of spaced portions each being spaced apart from the first substrate SUB1 and a plurality of contact portions each contacting the first substrate SUB1.

Each spaced portion is spaced apart from the first substrate SUB1 through one end to the other end in the first direction DR1. An upper surface of the first substrate SUB1, one spaced portion, and two contact portions respectively connected to opposite ends of the spaced portion define one cavity. Accordingly, the cavity has a tunnel shape extending in the first direction DR1.

The spaced portions and the contact portions are alternately arranged with each other in the second direction DR2 and are connected to each other to form the integral shape. Thus, the roof layer RFL and the first substrate SUB1 may define a plurality of cavities CAV arranged in the second direction DR2. Each cavity is opened in the first direction DR1 and closed in the second direction DR2.

The display devices DSP are disposed in the pixel area PA. In detail, the display devices DSP are respectively disposed in the cavities CAV.

The display devices DSP may be embodied in various ways as long as the display devices DSP display the light controlled by electrical signals. In an exemplary embodiment, each display device DSP may be a liquid crystal capacitor or an electrophoretic device, for example. In the case that the display device DSP is the liquid crystal capacitor, the cavities CAV may be filled with a liquid crystal layer (not shown). The liquid crystal layer (not shown) includes a plurality of liquid crystal molecules (not shown). The light amount of the light transmitting through the cavities CAV among the light provided from the backlight unit BLU by controlling an electric field generated in the display member 200-2.

The display member 200-2 may further include an insulating layer INL. The insulating layer INL is disposed on the roof layer RFL to cover the roof layer RFL. The insulating layer INL seals the cavities CAV.

The insulating layer INL may include a transparent insulating material. In an exemplary embodiment, the insulating layer INL may include an organic material and/or an inorganic material, for example. The insulating layer INL may include a plurality of organic layers and a plurality of inorganic layers alternately stacked with the organic layers.

The insulating layer INL may be, but not limited to, a sealing layer to seal the display device DSP from the external environment. As another way, the insulating layer INL may be, but not limited to, a planarization layer to provide a planarized surface. The insulating layer may be embodied in various ways and should not be limited to a specific exemplary embodiment.

The light conversion member CV is disposed on the insulating layer INL. The light conversion member CV may be directly disposed on the insulating layer INL or disposed on the insulating layer INL after being separately provided. In the case that the light conversion member CV is disposed on the insulating layer INL after being separately provided, a predetermined adhesive layer or an air layer AIR may further be provided between the light conversion member CV and the insulating layer INL.

Figure 16:
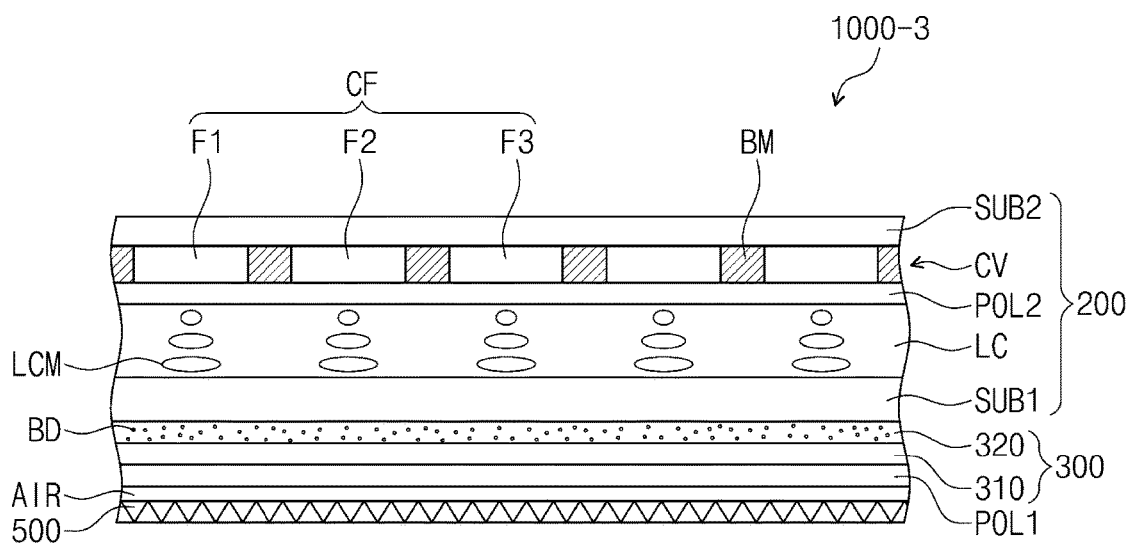
FIG. 16 is an enlarged cross-sectional view showing another exemplary embodiment of a display apparatus according to the invention.

FIG. 16 is an enlarged cross-sectional view showing a display apparatus 1000-3 according to another exemplary embodiment of the invention. In FIG. 16, the same reference numerals denote the same elements in the previously-mentioned embodiments, and thus detailed descriptions of the same elements will be omitted.

Referring to FIG. 16, an optical filter 300 according to the illustrated exemplary embodiment may be disposed between a first polarizing layer POL1 and a first substrate SUB1. Accordingly, a viewing angle control layer 320 couples the first substrate SUB1 and a transmission filter layer 310.

Figure 17:
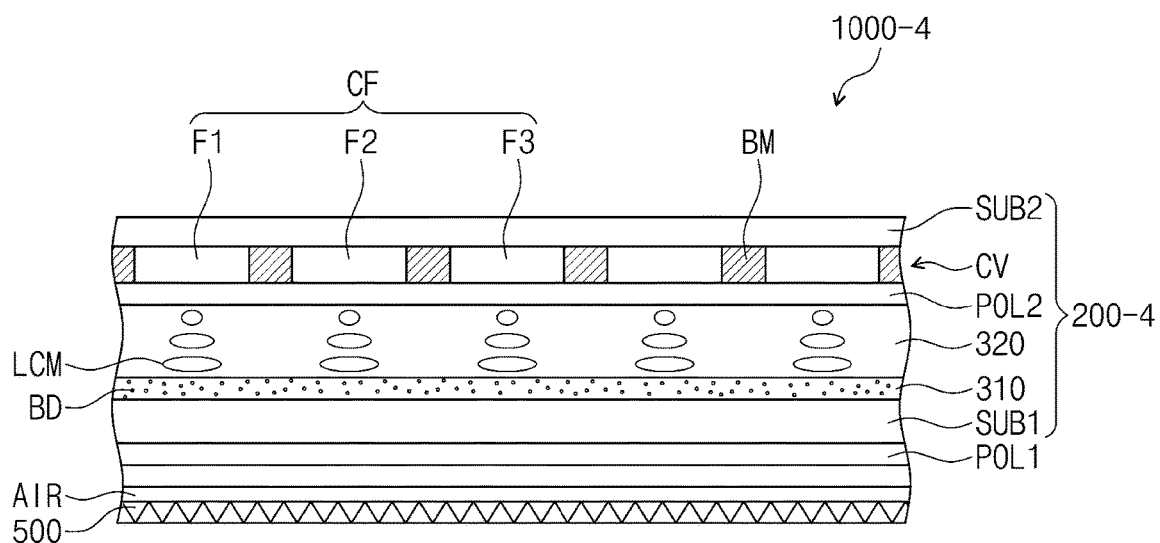
FIG. 17 is an enlarged cross-sectional view showing another exemplary embodiment of a display apparatus according to the invention.

FIG. 17 is an enlarged cross-sectional view showing a display apparatus 1000-4 according to another exemplary embodiment of the invention. In FIG. 17, the same reference numerals denote the same elements in the previously-mentioned embodiments, and thus detailed descriptions of the same elements will be omitted.

Referring to FIG. 17, a display member 200-4 includes a first substrate SUB1, a transmission filter layer 310, a viewing angle control layer 320, a light conversion member CV, a second polarizing layer POL2, and a second substrate SUB2.

The transmission filter layer 310 is disposed on the first substrate SUB1. The viewing angle control layer 320 is disposed between the light conversion member CV and the transmission filter layer 310, which are disposed under the second substrate SUB2. The viewing angle control layer 320 may include a plurality of liquid crystal molecules LCM. In an exemplary embodiment, the viewing angle control layer 320 may be a liquid crystal layer (not shown) in which a plurality of liquid crystal molecules LCM is aligned in a predetermined direction, for example. That is, the viewing angle control layer 320 may serve as a liquid crystal layer of an LCD panel.

Consequently, the contrast ratio of the display apparatus 1000 may be improved.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
a display module comprising a light conversion member comprising a plurality of quantum dots;
a backlight unit which provides a first light having a peak wavelength in a first wavelength range to the display module; and
an optical filter disposed between the display module and the backlight unit, the optical filter comprising:
a transmission filter layer which transmits a light in the first wavelength range, reflects a light in a second wavelength range, and has a first effective refractive index; and
a viewing angle control layer which is disposed between the transmission filter layer and the display module, couples the transmission filter layer and the display module, and has a second effective refractive index equal to or smaller than the first effective refractive index,
wherein:
the light conversion member converts a portion of the first light provided from the optical filter to a second light having a peak wavelength in the second wavelength range, and
a center wavelength of the second wavelength range is greater than a center wavelength of the first wavelength range.

2. The display apparatus of claim 1, wherein the first effective refractive index is equal to or greater than about 1.7 and equal to or smaller than about 2.2, and the second effective refractive index is greater than about 1.0.

3. The display apparatus of claim 2, wherein the second effective refractive index is equal to or greater than about 1.5.

4. The display apparatus of claim 3, further comprising:
an adhesive member which is disposed under the transmission filter layer and couples the backlight unit with the transmission filter layer.

5. The display apparatus of claim 3, wherein the backlight unit comprises:
a light source generating the first light;
a light guide plate guiding the first light provided from the light source to an upper direction; and
a light condensing member which is disposed above the light guide plate, condenses the first light and comprises a plurality of inverse prisms.

6. The display apparatus of claim 3, wherein the display module comprises:
a first substrate comprising a pixel area disposed thereon;
a second substrate disposed above the first substrate and comprising the light conversion member disposed thereon; and
a liquid crystal layer disposed between the first substrate and the second substrate.

7. The display apparatus of claim 6, further comprising:
a first polarizing layer disposed between the first substrate and the viewing angle control layer; and
a second polarizing layer disposed between the second substrate and the light conversion member, wherein the viewing angle control layer couples the transmission filter layer with the first polarizing layer.

8. The display apparatus of claim 6, further comprising:
a first polarizing layer disposed between the transmission filter layer and the backlight unit; and
a second polarizing layer facing the second substrate with the light conversion member therebetween.

9. The display apparatus of claim 6, wherein the light conversion member comprises:
a first conversion filter comprising a plurality of first particles which absorb the first light and convert the first light to the second light;
a second conversion filter comprising a plurality of second particles which absorb the first light and convert the first light to a third light,
the third light has a peak wavelength in a third wavelength range having a center wavelength greater than the center wavelength of the second wavelength range, and
a particle size of each of the plurality of first particles is different from a particle size of each of the plurality of second particles.

10. The display apparatus of claim 6, wherein
the display module further comprises a roof layer which is partially spaced apart from the first substrate and defines a plurality of cavities, and
the liquid crystal layer is disposed in each of the plurality of cavities.

11. The display apparatus of claim 6, wherein the transmission filter layer comprises:
a plurality of first insulating layers each having a first refractive index; and
a plurality of second insulating layers each having a second refractive index different from the first refractive index, and
wherein the plurality of first insulating layers is alternately stacked with the plurality of second insulating layers.

12. The display apparatus of claim 11, wherein a difference between the first refractive index and the second refractive index is greater than about zero (0) and equal to or smaller than about 0.5.

13. The display apparatus of claim 1, wherein the viewing angle control layer comprises an adhesive material.

14. The display apparatus of claim 13, wherein the viewing angle control layer comprises a plurality of beads.

15. A display apparatus comprising:
a backlight unit which provides a first light having a peak wavelength in a first wavelength range;
a light conversion member converting the first light to a second light or a third light;
a transmission filter layer which is disposed between the backlight unit and the light conversion member, receives the first light from the backlight unit, and has a first effective refractive index; and
a viewing angle control layer which is disposed between the transmission filter layer and the light conversion member, directly contacts the transmission filter layer and has a second effective refractive index equal to or smaller than the first effective refractive index,
wherein:
the transmission filter layer selectively transmits and reflects the first light provided from the backlight unit,
a transmission wavelength range of the transmission filter layer is overlapped with a wavelength range of the first light and a wavelength range of the third light,
a reflection wavelength range of the transmission filter layer is overlapped with a wavelength range of the second light, and
a center wavelength of the second light is greater than a center wavelength of the first light and smaller than a center wavelength of the third light.

16. The display apparatus of claim 15, wherein the viewing angle control layer comprises a liquid crystal layer.

17. A display apparatus comprising:
a display member comprising a light conversion member comprising a quantum dot;
a light source which is disposed under the display member and generates a light;
a light condensing member which condenses the light provided from the light source in an upper direction;
a transmission filter layer which is disposed between the light condensing member and the display member, transmits a light in a first wavelength range, reflects a light in a second wavelength range and transmits a light in a third wavelength range among the light condensed by the light condensing member; and
a viewing angle control layer which is disposed on the transmission filter layer and couples the display member with the transmission filter layer,
wherein:
the light conversion member converts a first light having a peak wavelength in the first wavelength range to a second light having a peak wavelength in the second wavelength range and a third light having a peak wavelength in the third wavelength range, a center wavelength of the second wavelength range is greater than a center wavelength of the first wavelength range and smaller than a center wavelength of the third wavelength range,
the transmission filter layer has a first effective refractive index, the viewing angle control layer has a second effective refractive index equal to or smaller than the first effective refractive index, and
a difference between the first effective refractive index and the second effective refractive index is equal to or greater than about zero (0) and equal to or smaller than about 0.7.

18. The display apparatus of claim 17, wherein the light generated by the light source is the first light.

19. The display apparatus of claim 17, wherein the light condensing member comprises a plurality of inverse prisms.

20. The display apparatus of claim 17, further comprising:
a first polarizing layer disposed between the display member and the light condensing member; and
a second polarizing layer disposed between the display member and the light conversion member.

21. A display apparatus comprising:
a backlight unit which generates a first light;
a light conversion member which receives the first light and converts the first light to a second light or a third light, which is different from the first light; and
an optical filter which is disposed between the backlight unit and the light conversion member, transmits a light having a first wavelength range overlapped with a wavelength range of the first light and a light having a third wavelength range overlapped with a wavelength range of the third light, and reflecting a light having a wavelength range having a range value between the first wavelength range and the third wavelength range, wherein:
when an emission angle of the first light traveling to the optical filter from the backlight unit is zero (0), a cut-off amount defined by an amount in which the reflection wavelength range of the optical filter is overlapped with the wavelength range of the first light has a minimum value, and
the cut-off amount increases according to an increase of the emission angle,
wherein the optical filter comprises:
a transmission filter layer which transmits the light in the first wavelength range and the light having the third wavelength range, reflects the light in the third wavelength range, and has a first effective refractive index; and
a viewing angle control layer which is disposed between the transmission filter layer and the light conversion member and has a second effective refractive index equal to or smaller than the first effective refractive index.

22. The display apparatus of claim 21, wherein the minimum value of the cut-off amount is zero (0).

* * * * *